US011223968B2

(12) United States Patent
Fang et al.

(10) Patent No.: US 11,223,968 B2
(45) Date of Patent: Jan. 11, 2022

(54) METHOD, APPARATUS AND SYSTEM FOR REPORTING RADIO ACCESS NETWORK TRAFFIC

(71) Applicant: XI'AN ZHONGXING NEW SOFTWARE CO., LTD., Shaanxi (CN)

(72) Inventors: Jianmin Fang, Shenzhen (CN); Zijiang Ma, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/977,872

(22) PCT Filed: Jan. 9, 2019

(86) PCT No.: PCT/CN2019/070937
§ 371 (c)(1),
(2) Date: Sep. 3, 2020

(87) PCT Pub. No.: WO2019/174386
PCT Pub. Date: Sep. 19, 2019

(65) Prior Publication Data
US 2021/0029568 A1 Jan. 28, 2021

(30) Foreign Application Priority Data
Mar. 16, 2018 (CN) .......................... 201810219173.0

(51) Int. Cl.
H04W 24/10 (2009.01)
H04W 24/08 (2009.01)

(52) U.S. Cl.
CPC ........... H04W 24/10 (2013.01); H04W 24/08 (2013.01)

(58) Field of Classification Search
None
See application file for complete search history.

(56) References Cited

U.S. PATENT DOCUMENTS

2006/0164981 A1* 7/2006 Olsson .................. H04L 1/1854
370/229
2008/0163309 A1* 7/2008 Kauranen ........... H04L 12/1403
725/62

(Continued)

FOREIGN PATENT DOCUMENTS

CN 101247238 A 8/2008
CN 102300264 A 12/2011

(Continued)

OTHER PUBLICATIONS

International Search Report Form PCT/ISA/210, and Written Opinion Form PCT/ISA/237, International Application No. PCT/CN2019/070937 pp. 1-7 International Filing Date Jan. 9, 2019, dated Apr. 3, 2019.

Primary Examiner — Adolf Dsouza
(74) Attorney, Agent, or Firm — Bond Schoeneck & King, PLLC; George McGuire

(57) ABSTRACT

The radio access network data volume report method includes that a node acquires data volume information about a data radio bearer, where the data volume information about the data radio bearer includes data volume of a packet data convergence protocol protocol data unit (PDCP PDU) or a packet data convergence protocol service data unit (PDCP SDU) generated by a packet data convergence protocol (PDCP), and data volume of a PDCP PDU or a PDCP SDU issued by the PDCP to radio link control; the node generates a radio access network data volume report according to the data volume information about the data radio bearer; and the node sends the radio access network data volume report to a core network.

14 Claims, 9 Drawing Sheets

(56) References Cited

U.S. PATENT DOCUMENTS

| | | | |
|---|---|---|---|
| 2013/0265979 A1* | 10/2013 | Yamaguchi | H04W 28/0278 370/329 |
| 2016/0359695 A1 | 12/2016 | Yadav et al. | |
| 2020/0119864 A1* | 4/2020 | Xu | H04W 80/08 |

FOREIGN PATENT DOCUMENTS

| CN | 102638781 A | 8/2012 |
|---|---|---|
| CN | 106686660 A | 5/2017 |
| CN | 107623611 A | 1/2018 |

* cited by examiner

US 11,223,968 B2

METHOD, APPARATUS AND SYSTEM FOR REPORTING RADIO ACCESS NETWORK TRAFFIC

CROSS-REFERENCE TO RELATED APPLICATION

The present application is the United States National Phase application of PCT Application No. PCT/CN2019/070937 filed on Jan. 9, 2019, which relates and claims priority to Chinese patent application No. 201810219173.0, filed on Mar. 16, 2018, the entirety of each of which is incorporated herein by reference.

TECHNICAL FIELD

The present application relates to communication technologies and, for example, to a radio access network data volume report method, apparatus and system, and a computer-readable storage medium.

BACKGROUND

A carrier aggregation (CA) function is supported in both a 4-th generation (4G) system and a 5-th generation (5G) system. Under the CA function, a UE may send and receive data on multiple component carriers (CC) simultaneously. A CC initially accessed by the user equipment (UE) is a primary component carrier (PCC), and other CCs are referred to as secondary component carriers (SCCs). An SCC is configured by a node after the UE enters a connectivity state. A serving cell corresponding to the PCC is referred to as a primary cell (PCell). A serving cell corresponding to the SCC is referred to as a secondary cell (SCell).

A dual connectivity (DC) function is supported in both the 4G system and the 5G system. Under the dual connectivity function, the UE may maintain connection with two nodes simultaneously. One node is referred to as a master node (MN), and the other node is referred to as a secondary node (SN).

In the 5G system, duplication transmission is supported in both a carrier aggregation operation and a dual connectivity operation. In this case, one packet data convergence protocol (PDCP) entity corresponds to two or more radio link control (RLC) entities, and multiple RLC entities respectively transmit same data on different serving cells of a same node (in CA operation), or on different nodes (in DC operation). In a case where the UE performs the duplication transmission, the lack of a radio access network data volume report solution cannot satisfy the needs of operators.

SUMMARY

Embodiments of the present application provide a radio access network data volume report method, apparatus and system, and a computer-readable storage medium, so as to implement a radio access network data volume report when a UE performs duplication transmission, and thus the needs of operators is satisfied.

An embodiment of the present application provides a radio access network data volume report method. The method includes the steps described below.

A node acquires data volume information about a data radio bearer. The data volume information about the data radio bearer includes data volume of a packet data convergence protocol protocol data unit (PDCP PDU) or a packet data convergence protocol service data unit (PDCP SDU) generated by a packet data convergence protocol (PDCP), and data volume of a PDCP PDU or a PDCP SDU issued by the PDCP to radio link control.

The node generates a radio access network data volume report according to the data volume information about the data radio bearer. The radio access network data volume report includes at least one of: radio access network data volume of a granularity unit where a duplicated part is not counted, radio access network data volume of the granularity unit where the duplicated part is counted, or radio access network data volume of the duplicated part of the granularity unit.

The node sends the radio access network data volume report to a core network.

An embodiment of the present disclosure provides a radio access network data volume report apparatus. The apparatus includes a memory and a processor. The memory stores a program. The radio access network data volume report method described above is performed when the program is read and executed by the processor.

An embodiment of the present application provides a computer-readable storage medium. The computer-readable storage medium stores one or more programs. The one or more programs are executable by one or more processors to perform the radio access network data volume report method of any embodiment.

At least one embodiment of the present application provides a radio access network data volume report system. The system includes a node and a core network.

The node is configured to acquire data volume information about a data radio bearer, where the data volume information about the data radio bearer includes data volume of a PDCP PDU or a PDCP SDU generated by a PDCP, and data volume of a PDCP PDU or a PDCP SDU issued by the PDCP to radio link control; generate a radio access network data volume report according to the data volume information about the data radio bearer; and send the radio access network data volume report to the core network, where the radio access network data volume report includes at least one of: radio access network data volume of a granularity unit where a duplicated part is not counted, radio access network data volume of the granularity unit where the duplicated part is counted, or radio access network data volume of the duplicated part of the granularity unit.

The core network is configured to receive the radio access network data volume report sent by the node.

BRIEF DESCRIPTION OF DRAWINGS

The drawings are provided for a further understanding of the solutions of the present application, and constitute a part of the specification. The drawings together with embodiments of the present application are used for explaining the solutions of the present application, and not intended to limit the embodiments of the present disclosure.

DETAILED DESCRIPTION

Figure 1:
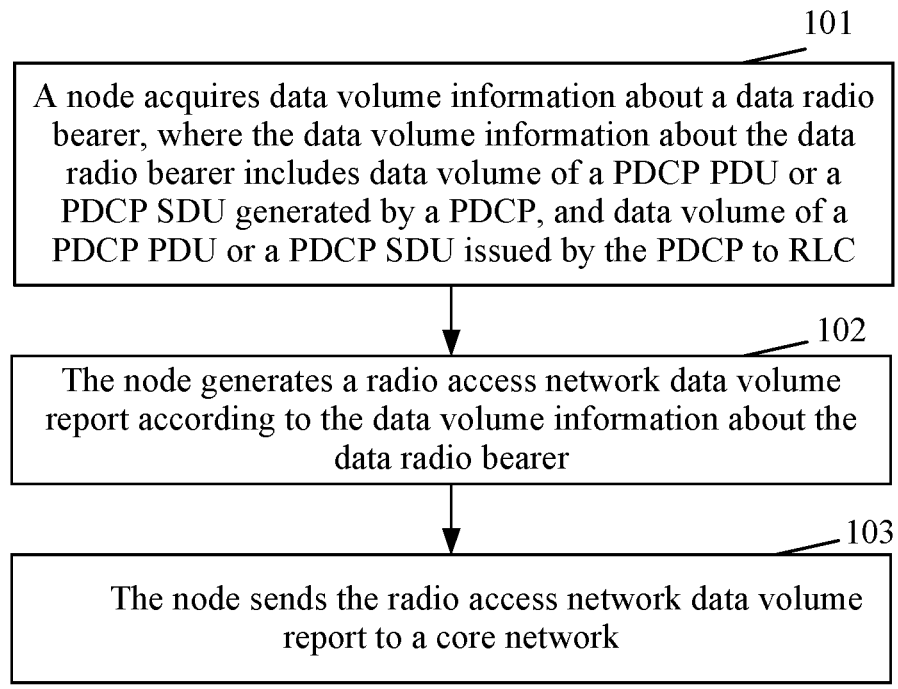
FIG. 1 is a flowchart of a radio access network data volume report method according to an embodiment of the present application.

The embodiments of the present application are described hereinafter in detail with reference to the drawings. It is to be noted that in the case of no conflict, the embodiments and features therein of the present application may be combined with each other.

The steps illustrated in the flowcharts among the drawings may be performed by a computer system such as a group of computers capable of executing instructions. Moreover, although logical sequences are illustrated in the flowcharts, the illustrated or described steps may be performed in sequences different from those described herein in some cases.

A 4G node is referred to as an evolved node B (eNB). An interface between eNBs is referred to as an X2 interface. An interface between the eNB and a core network (CN) is referred to as an S1 interface. A 5G node is referred to as a new generation radio access network node (NG RAN node or gNB). An interface between gNBs is referred to as an Xn interface. An interface between the gNB and the CN is referred to as an NG interface.

In a 4G system, data streams having a same quality of service (QoS) requirement are aggregated into a bearer, both the eNB and the CN process QoS based on the bearer, and each network bearer at the S1 interface corresponds to a respective radio bearer at a Uu interface.

A new QoS mechanism is used in a 5G system. The concept of a radio bearer is retained for the Uu interface, that is, a data radio bearer. However, instead of a network bearer, a protocol data unit session (PDU) and a quality of service flow (QoS flow) are used for the NG interface. The UE may establish multiple PDU sessions. A PDU session may contain multiple QoS flows. Multiple QoS flows of a same PDU session may be mapped to a same DRB. QoS flows of different PDU sessions cannot be mapped to a same DRB. The QoS flow includes a guaranteed bit rate quality of service flow (GBR QoS flow) and a non-guaranteed bit rate quality of service flow (non-GBR QoS flow).

In the 5G node, a new service data adaptation protocol (SDAP) is introduced on the basis of a packet data convergence protocol (PDCP) and used for the mapping between QoS flows and DRBs. Each PDU Session corresponds to a respective SDAP entity. Each DRB corresponds to a respective PDCP entity.

The 5G node may include a central unit (CU) and a distributed unit (DU). A node may include one CU and multiple DUs, and this case may refer to as a CU DU split. An interface between a CU and a DU is referred to as an F1 interface.

The CU of the 5G node may include a control plane (CP) and a user plane (UP), and this case may refer to as a CP UP split. An interface between a CP and a UP is referred to as an E1 interface.

Embodiment 0

Configuration information sent by a CN to a node (or an MN in the case of dual connectivity) includes at least one of: UE identification, E-RAB identification (for example, in the case of a 4G CN), PDU session identification (for example, in the case of a 5G CN), QoS flow identification (for example, in the case of the 5G CN), an indication whether a duplicated part is counted into an RAN data volume report in duplication transmission, or information about radio access technology (RAT) into which data volume is counted in duplication transmission (required in a case where an MN and an SN use different RATs and a duplicated part is not counted). A configuration granularity of the CN may be a UE, an E-RAB (for example, in the case of the 4G CN), a PDU session (for example, in the case of the 5G CN), and a QoS flow level (for example, in the case of the 5G CN). The configuration information may be carried by a message at an existing interface between a CN and a node, such as an S1 or an NG, or by a message at a new interface between a CN and a node.

In the case of the dual connectivity, configuration information sent by the MN to the SN includes at least one of UE identification, E-RAB identification (for example, in the case of the 4G CN), PDU session identification (for example, in the case of the 5G CN), QoS flow identification (for example, in the case of the 5G CN), an indication whether a duplicated part is counted into an RAN data volume report in duplication transmission, or information about RAT into which data volume is counted in duplication transmission (required in a case where an MN and an SN use different RATs and a duplicated part is not counted). The configuration information may be carried by a message at an existing interface between nodes, such as an X2 or an Xn, or by a message at a new interface between nodes.

In the case of the dual connectivity, the SN performs the statistics for each DRB of the PDCP on a SN side. If data volume of a PDCP PDU generated by a PDCP is V, data volume of a PDCP PDU issued by the PDCP to RLC of the SN side is Vs (may be equal to 0), and data volume of a PDCP PDU issued by the PDCP to RLC of an MN side is Vm (may be equal to 0), then RAN data volume V1 where a duplicated part is not counted satisfies that V1=V, RAN data volume Vd of the duplicated part satisfies that Vd=Vs+Vm−V, RAN data volume V2 where the duplicated part is counted satisfies that V2=Vs+Vm, data volume in RAT VrS2 at the SN side where the duplicated part is counted satisfies that VrS2=Vs, and data volume in RAT at the MN side where the duplicated part is counted satisfies that VrM2=Vm. In a case where data volume in duplication transmission counted into a RAT is a RAT of the SN side, data volume in RAT VrS1 at the SN side where the duplicated part is not counted satisfies that VrS1=Vs, and data volume in RAT at the MN side i where the duplicated part is not counted satisfies that VrM1=Vm−Vd. In a case where data volume in duplication transmission counted into a RAT is a RAT of the MN side, the data volume in RAT VrS1 at the SN side where the duplicated part is not counted satisfies that VrS1=Vs−Vd, and the data volume in RAT at the MN side where the duplicated part is not counted satisfies that VrM1=Vm.

In the case of the dual connectivity, an RAN data volume report sent by the SN to the MN includes at least one piece of the following information of each DRB of the PDCP at the SN side: RAN data volume V1 where a duplicated part is not counted, RAN data volume V2 where a duplicated part is counted, RAN data volume Vd of a duplicated part, data volume in RAT VrS2 at the SN side where a duplicated part is counted, data volume in RAT VrM2 at the MN side where a duplicated part is counted, data volume in RAT VrS1 at the SN side where a duplicated part is not counted, or data volume in RAT VrM1 at the MN side where a duplicated part is not counted. The RAN data volume report may be carried by a message at an existing interface between nodes, such as an X2 or an Xn, or by a message at a new interface between nodes.

The node (or the MN in the case of the dual connectivity) performs the statistics for each DRB of the PDCP at the MN side. If data volume of a PDCP PDU generated by the PDCP is V, data volume of a PDCP PDU issued by the PDCP to RLC of the MN side is Vm (may be equal to 0), and data volume of a PDCP PDU issued by the PDCP to RLC of the SN side is Vs (may be equal to 0), then RAN data volume V1 where a duplicated part is not counted satisfies that V1=V, RAN data volume Vd of a duplicated part satisfies that Vd=Vs+Vm−V, RAN data volume V2 where the duplicated part is not counted satisfies that V2=Vs+Vm, data volume in RAT VrS2 at the SN side where the duplicated part is not counted satisfies that VrS2=Vs, and data volume in RAT at the MN side where the duplicated part is not counted satisfies that VrM2=Vm. In a case where data volume in duplication transmission counted into a RAT is a RAT of the SN side, data volume in RAT VrS1 at the SN side where a duplicated part is not counted satisfies that VrS1=Vs, and data volume in RAT VrM1 at the MN side where a duplicated part is not counted satisfies that VrM1=Vm−Vd. In a case where data volume in duplication transmission counted into a RAT is a RAT of the MN side, the data volume in RAT VrS1 at the SN side where a duplicated part is not counted satisfies that VrS1=Vs−Vd, and the data volume in RAT at the MN side where a duplicated part is not counted satisfies that VrM1=Vm.

An RAN data volume report sent by the node (or the MN in the case of the dual connectivity) to the CN includes at least one of:

UE identification, and RAN data volume of the UE where a duplicated part is not counted (that is, the sum of V1 of all DRBs of the UE);

UE identification, and RAN data volume in RAT of the UE at the MN side where a duplicated part is not counted (that is, the sum of VrM1 of all DRBs of the UE);

UE identification, and RAN data volume in RAT of the UE at the SN side where a duplicated part is not counted (that is, the sum of VrS1 of all DRBs of the UE);

UE identification, and RAN data volume of the UE where a duplicated part is counted (that is, the sum of V2 of all DRBs of the UE);

UE identification, and RAN data volume in RAT of the UE at the MN side where a duplicated part is counted (that is, the sum of VrM2 of all DRBs of the UE);

UE identification, and RAN data volume in RAT of the UE at the SN side where a duplicated part is counted (that is, the sum of VrS2 of all DRBs of the UE);

UE identification, and RAN data volume of a duplicated part of the UE (that is, the sum of Vd of all DRBs of the UE);

E-RAB identification, and RAN data volume of the E-RAB where a duplicated part is not counted (that is, V1 of a DRB corresponding to the E-RAB);

E-RAB identification, and RAN data volume in RAT of the E-RAB at the MN side where a duplicated part is not counted (that is, VrM1 of a DRB corresponding to the E-RAB);

E-RAB identification, and RAN data volume in RAT of the E-RAB at the SN side where a duplicated part is not counted (that is, VrS1 of a DRB corresponding to the E-RAB);

E-RAB identification, and RAN data volume of the E-RAB where a duplicated part is counted (that is, V2 of a DRB corresponding to the E-RAB);

E-RAB identification, and RAN data volume in RAT of the E-RAB at the MN side where a duplicated part is counted (that is, VrM2 of a DRB corresponding to the E-RAB);

E-RAB identification, and RAN data volume in RAT of the E-RAB at the SN side where a duplicated part is counted (that is, VrS2 of a DRB corresponding to the E-RAB);

E-RAB identification, and RAN data volume of a duplicated part of the E-RAB (that is, Vd of a DRB corresponding to the E-RAB);

PDU session identification, and RAN data volume of the PDU session where a duplicated part is not counted (that is, the sum of V1 of all DRBs of the PDU session);

PDU session identification, and RAN data volume in RAT of the PDU session at the MN side where a duplicated part is not counted (that is, the sum of VrM1 of all DRBs of the PDU session);

PDU session identification, and RAN data volume in RAT of the PDU session at the SN side where a duplicated part is not counted (that is, the sum of VrS1 of all DRBs of the PDU session);

PDU session identification, and RAN data volume of the PDU session where a duplicated part is counted (that is, the sum of V2 of all DRBs of the PDU session);

PDU session identification, and RAN data volume in RAT of the PDU session at the MN side where a duplicated part is counted (that is, the sum of VrM2 of all DRBs of the PDU session);

PDU session identification, and RAN data volume in RAT of the PDU session at the SN side where a duplicated part is counted (that is, the sum of VrS2 of all DRBs of the PDU session);

PDU session identification, and RAN data volume of a duplicated part of the PDU session (that is, the sum of Vd of all DRBs of the PDU session);

QoS flow identification, and RAN data volume of the QoS flow where a duplicated part is not counted (that is, V1 of a DRB corresponding to the QoS flow in the case where each QoS flow corresponds to a respective DRB);

QoS flow identification, and RAN data volume in RAT of the QoS flow at the MN side where a duplicated part is not counted (that is, VrM1 of a DRB corresponding to the QoS flow in the case where each QoS flow corresponds to a respective DRB);

QoS flow identification, and RAN data volume in RAT of the QoS flow at the SN dide where a duplicated part is not counted (that is, VrS1 of a DRB corresponding to the QoS flow in the case where each QoS flow corresponds to a respective DRB);

QoS flow identification, and RAN data volume of the QoS flow where a duplicated part is counted (that is, V2 of a DRB corresponding to the QoS flow in the case where each QoS flow corresponds to a respective DRB);

QoS flow identification, and RAN data volume in RAT of the QoS flow at the MN side where a duplicated part is counted (that is, VrM2 of a DRB corresponding to the QoS flow in the case where each QoS flow corresponds to a respective DRB);

QoS flow identification, and RAN data volume in RAT of the QoS flow at the SN side where a duplicated part is counted (that is, VrS2 of a DRB corresponding to the QoS flow in the case where each QoS flow corresponds to a respective DRB);

QoS flow identification, and RAN data volume of a duplicated part of the QoS flow (that is, Vd of a DRB corresponding to the QoS flow in the case where each QoS flow corresponds to a respective DRB);

a QoS flow identification list, and RAN data volume of the QoS flow group where a duplicated part is not counted (that is, V1 of a DRB corresponding to the QoS flow group in the case where each DRB corresponds to multiple QoS flows);

a QoS flow identification list, and RAN data volume in RAT of the QoS flow group at the MN side where a duplicated part is not counted (that is, VrM1 of a DRB corresponding to the QoS flow group in the case where each DRB corresponds to multiple QoS flows);

a QoS flow identification list, and RAN data volume in RAT of the QoS flow group at the SN side where a duplicated part is not counted (that is, VrS1 of a DRB corresponding to the QoS flow group in the case where each DRB corresponds to multiple QoS flows);

a QoS flow identification list, and RAN data volume of the QoS flow group where a duplicated part is counted (that is, V2 of a DRB corresponding to the QoS flow group in the case where each DRB corresponds to multiple QoS flows);

a QoS flow identification list, and RAN data volume of the QoS flow group at the MN side where a duplicated part is counted (that is, VrM2 of a DRB corresponding to the QoS flow group in the case where each DRB corresponds to multiple QoS flows);

a QoS flow identification list, and RAN data volume in RAT of the QoS flow group at the SN side where a duplicated part is counted (that is, VrS2 of a DRB corresponding to the QoS flow group in the case where each DRB corresponds to multiple QoS flows); or a QoS flow identification list, and RAN data volume of a duplicated part of the QoS flow group (that is, Vd of a DRB corresponding to the QoS flow group in the case where each DRB corresponds to multiple QoS flows).

The RAN data volume report may be carried by a message at an existing interface between the CN and the node, such as an S1 or an NG, or by a message at a new interface between the CN and the node.

Embodiment 1

This embodiment provides a radio access network data volume report method. The method includes steps 101, 102 and 103.

In step 101, a node acquires data volume information about a data radio bearer. The data volume information about the data radio bearer includes data volume of a PDCP PDU or a PDCP service data unit (PDCP SDU) generated by a PDCP, and data volume of a PDCP PDU or a PDCP SDU issued by the PDCP to RLC.

In step 102, the node generates a radio access network data volume report according to the data volume information about the data radio bearer. The radio access network data volume report includes at least one of RAN data volume of a granularity unit where a duplicated part is not counted, RAN data volume of the granularity unit where the duplicated part is counted, or RAN data volume of the duplicated part of the granularity unit.

In step 103, the node sends the radio access network data volume report to a core network.

In step 102, the granularity unit refers to an object for data volume statistics, such as a UE (where data volume statistics is conducted for the UE), an evolved universal terrestrial radio access bearer (E-UTRAN radio access bearer, E-RAB) (where data volume statistics is conducted for the E-RAB), a PDU session (where data volume statistics is conducted for the PDU session), a QoS flow (where data volume statistics is conducted for the QoS flow), and a QoS flow group (where data volume statistics is conducted for the QoS flow group). For example, in the case where the granularity unit is the UE, the information in the radio access network data volume report includes identification information about the UE, RAN data volume of the UE where a duplicated part is not counted, RAN data volume of the UE where a duplicated part is counted, and RAN data volume of the duplicated part of the UE. For another example, in the case where the granularity unit is the E-RAB, the information in the radio access network data volume report includes identification information about the E-RAB, RAN data volume of the E-RAB where a duplicated part is not counted, and RAN data volume of the E-RAB where a duplicated part is counted, and RAN data volume of the duplicated part of the E-RAB. The configuration granularity below is the corresponding granularity unit information.

The data volume of the PDCP SDU is the data volume of the PDCP PDU minus the overheads of a PDCP header.

In an embodiment, the step of acquiring the data volume of the PDCP PDU or the PDCP SDU issued by the PDCP to the radio link control includes: in a case where the PDCP corresponding to the DRB and the RLC are located at different nodes (for example, in the case of dual connectivity or a CU DU split), in response to acquiring the data volume of the PDCP PDU or the PDCP SDU issued by the PDCP to the radio link control, removing data volume of data packets lost at an interface between the node where the PDCP is located and a node where the radio link control is located.

In an embodiment, the step of acquiring the data volume of the PDCP PDU or the PDCP SDU issued by the PDCP to the radio link control includes: in response to acquiring the data volume of the PDCP PDU or the PDCP SDU issued by the PDCP to the radio link control, removing data volume of data packets the PDCP has determined to discard.

Descriptions are given below in two cases.

1. In the case of the dual connectivity, the node includes an MN and an SN. The MN and SN may use the same RAT, or different RAT.

In an embodiment, the MN receives first configuration information sent by the CN or OAM. The first configuration information includes at least one of an indication whether the duplicated part is counted into a radio access network data volume report in duplication transmission, information about radio access technology into which data volume is counted in duplication transmission, or granularity unit information.

The MN sends second configuration information to the SN. The second configuration information includes at least one of an indication whether the duplicated part is counted into a radio access network data volume report in the duplication transmission, information about radio access technology into which data volume is counted in duplication transmission, or granularity unit information. The first configuration information may be carried by a message at an existing interface between the CN and the node, such as an S1 or an NG, or by a message at a new interface between the CN and the node. The second configuration information may be carried by a message at an existing interface between nodes, such as an X2 or an Xn, or by a message at a new interface between nodes.

In an embodiment, the first configuration information includes at least one of UE identification, evolved universal terrestrial radio access bearer (E-UTRAN radio access bearer, E-RAB) identification (in the case of a 4G CN), PDU session identification (in the case of a 5G CN), QoS flow identification (in the case of the 5G CN), the indication whether the duplicated part is counted into a radio access network (RAN) data volume report in the duplication transmission, or information about the radio access technology (RAT) into which the data volume is counted in the duplication transmission (required in the case where the MN uses different RAT than the SN and the duplicated part is not counted). A configuration granularity of the CN may be a UE, an E-RAB (for example, in the case of the 4G CN), a PDU session (for example, in the case of the 5G CN), and a QoS flow level (for example, in the case of the 5G CN).

In an embodiment, the second configuration information includes at least one of UE identification, E-RAB identification (for example, in the case of the 4G CN), PDU session identification (for example, in the case of the 5G CN), QoS flow identification (for example, in the case of the 5G CN), the indication whether the duplicated part is counted into an RAN data volume report in the duplication transmission, or information about the RAT into which the data volume is counted in the duplication transmission (required in the case where the MN uses different RAT than the SN and the duplicated part is not counted).

In an embodiment, the step in which the node acquires the data volume information about the data radio bearer includes the steps described below.

The master node acquires information about each PDCP at a master node side. The information about each PDCP at the master node side includes data volume of a PDCP PDU or a PDCP SDU generated by the each PDCP, data volume of a PDCP PDU or a PDCP SDU issued by the each PDCP to RLC of the master node side, and data volume of a PDCP PDU or a PDCP SDU issued by the each PDCP to RLC of the secondary node side.

The secondary node acquires information about each PDCP at a secondary node side. The information about each PDCP at the secondary node side includes data volume of a PDCP PDU or a PDCP SDU generated by the each PDCP, data volume of a PDCP PDU or a PDCP SDU issued by the each PDCP to RLC of the master node side, and data volume of a PDCP PDU or a PDCP SDU issued by the each PDCP to RLC of the secondary node side.

The step in which the node generates the radio access network data volume report according to the data volume information about the data radio bearer includes the steps described below.

The secondary node generates a first radio access network data volume report and sends the first radio access network data volume report to the master node. The first radio access network data volume report includes at least one piece of following information at the secondary node side: RAN data volume of a granularity unit (at the secondary side) where a duplicated part is not counted, data volume in RAT of a granularity unit at the master node side where a duplicated part is not counted, data volume in RAT of the granularity unit at the secondary node side where the duplicated part is not counted, RAN data volume of the granularity unit where the duplicated part is counted, data volume in RAT of the granularity unit at the master node side where a duplicated part is counted, data volume in RAT of the granularity unit at the secondary node side where the duplicated part is counted, or RAN data volume of the duplicated part of the granularity unit.

The master node generates a second radio access network data volume report. The second radio access network data volume report includes identification information about a granularity unit, and at least one of:

RAN data volume of a granularity unit (the granularity unit is located at the at least one of the master node side or the secondary node side, for example, in a case where the granularity is the UE, the granularity unit is located at the master node side and the secondary node side; for another example, in a case where the granularity is the PDU session, the granularity unit is located at the at least one of the master node side or the secondary node side, where in the dual connectivity, the PDU session may be at the master node side, at the secondary node side, or split at the master node side and the secondary node side; and for another example, in a case where the granularity is the QoS flow or the E-RAB, the granularity unit is located at the master node side or the secondary node side) where a duplicated part is not counted, data volume in RAT of the granularity unit at the master node side where the duplicated part is not counted, data volume in RAT of the granularity unit at the secondary node side where the duplicated part is not counted, RAN data volume of the granularity unit where the duplicated part is counted, data volume in RAT of the granularity unit at the master node side where the duplicated part is counted, data volume in RAT of the granularity unit at the secondary node where the duplicated part is counted, or RAN data volume of the duplicated part of the granularity unit.

The step in which the node sends the radio access network data volume report to the core network includes that the master node sends the second radio access network data volume report to the core network.

The secondary node generates the first radio access network data volume report according to the second configuration information and the data volume information about the data radio bearer. The master node generates the second radio access network data volume report according to the first configuration information and the data volume information about the data radio bearer.

In an embodiment, the SN performs the statistics for each DRB of the PDCP at the SN side. If data volume of a PDCP PDU generated by the PDCP is V, data volume of a PDCP PDU issued by the PDCP to RLC of the SN side is Vs (may be equal to 0), and data volume of a PDCP PDU issued by the PDCP to RLC of the MN side is Vm (may be equal to 0), then RAN data volume V1 where a duplicated part is not counted satisfies that V1=V, RAN data volume Vd of a duplicated part satisfies that Vd=Vs+Vm−V, RAN data volume V2 where the duplicated part is not counted satisfies that V2=Vs+Vm, data volume in RAT VrS2 at the SN side where the duplicated part is not counted satisfies that VrS2=Vs, and data volume in RAT at the MN side where the duplicated part is not counted satisfies that VrM2=Vm. In a case where data volume in duplication transmission counted into a RAT is a RAT of the SN side, data volume in RAT VrS1 at the SN side where a duplicated part is not counted satisfies that VrS1=Vs, and data volume in RAT VrM1 at the MN side where a duplicated part is not counted satisfies that VrM1=Vm−Vd. In a case where data volume in duplication transmission counted into a RAT is a RAT of the MN side, the data volume in RAT VrS1 at the SN side where a duplicated part is not counted satisfies that VrS1=Vs−Vd, and the data volume in RAT at the MN side where a duplicated part is not counted satisfies that VrM1=Vm.

The SN sends an RAN data volume report to the MN. The RAN report includes at least one piece of the following information of each DRB of the PDCP at the SN side: the RAN data volume V1 where a duplicated part is not counted, the RAN data volume V2 where the duplicated part is not counted, the RAN data volume Vd of the duplicated part, the data volume in RAT VrS2 at the SN side where the duplicated part is not counted, the data volume in RAT VrM2 at the MN side where the duplicated part is not counted, the data volume in RAT VrS1 at the SN side where a duplicated part is not counted, or the data volume in RAT VrM1 at the MN side where a duplicated part is not counted. The RAN data volume report may be carried by a message of an existing interface between nodes, such as an X2 or an Xn, or by a message of a new interface between nodes.

The MN performs the statistics for each DRB of a PDCP at the MN side. If data volume of a PDCP PDU generated by the PDCP is V, data volume of a PDCP PDU issued by the PDCP to RLC of the MN side is Vm (may be equal to 0), and data volume of a PDCP PDU issued by the PDCP to RLC of the SN side is Vs (may be equal to 0), then the results can be derived described below.

RAN data volume V1 where a duplicated part is not counted satisfies that V1=V. RAN data volume Vd of a duplicated part satisfies that Vd=Vs+Vm−V. RAN data volume V2 where the duplicated part is not counted satisfies that V2=Vs+Vm. data volume in RAT VrS2 at the SN side where the duplicated part is not counted satisfies that VrS2=Vs. data volume in RAT at the MN side where the duplicated part is not counted satisfies that VrM2=Vm. In a case where data volume in duplication transmission counted into a RAT is a RAT of the SN side, data volume in RAT VrS1 at the SN side where a duplicated part is not counted satisfies that VrS1=Vs, and data volume in RAT VrM1 at the MN side where a duplicated part is not counted satisfies that VrM1=Vm−Vd. In a case where data volume in duplication transmission counted into a RAT is a RAT of the MN side, the data volume in RAT VrS1 at the SN side where a duplicated part is not counted satisfies that VrS1=Vs−Vd, and the data volume in RAT at the MN side where a duplicated part is not counted satisfies that VrM1=Vm.

In an embodiment, the MN sends an RAN data volume report to the CN. The RAN data volume report includes at least one of:

UE identification, and RAN data volume of the UE where a duplicated part is not counted (that is, the sum of V1 of all DRBs of the UE);

UE identification, and RAN data volume of the UE where a duplicated part is not counted (that is, the sum of VrM1 of all DRBs of the UE at the MN side and the SN side);

UE identification, and RAN data volume of the UE where a duplicated part is not counted (that is, the sum of VrS1 of all DRBs of the UE at the MN side and the SN side);

UE identification, and RAN data volume of the UE where a duplicated part is counted (that is, the sum of V2 of all DRBs of the UE at the MN side and the SN side);

UE identification, and RAN data volume in RAT of the UE at the MN side where a duplicated part is counted (that is, the sum of VrM2 of all DRBs of the UE at the MN side and the SN side);

UE identification, and RAN data volume in RAT of the UE at the SN side where a duplicated part is counted (that is, the sum of VrS2 of all DRBs of the UE at the MN side and the SN side);

UE identification, and RAN data volume of a duplicated part of the UE (that is, the sum of Vd of all DRBs of the UE at the MN side and the SN side);

E-RAB identification, and RAN data volume of the E-RAB where a duplicated part is not counted (that is, V1 of a DRB corresponding to the E-RAB at the MN side or the SN side);

E-RAB identification, and RAN data volume of the E-RAB where a duplicated part is not counted (that is, VrM1 of a DRB corresponding to the E-RAB at the MN side or the SN side);

E-RAB identification, and RAN data volume in RAT of the E-RAB at the SN side where a duplicated part is not counted (that is, VrS1 of a DRB corresponding to the E-RAB at the MN side or the SN side);

E-RAB identification, and RAN data volume of the E-RAB where a duplicated part is counted (that is, V2 of a DRB corresponding to the E-RAB at the MN side or the SN side);

E-RAB identification, and RAN data volume in RAT of the E-RAB at the SN side where a duplicated part is counted (that is, VrM2 of a DRB corresponding to the E-RAB at the MN side or the SN side);

E-RAB identification, and RAN data volume in RAT of the E-RAB at the SN side where a duplicated part is counted (that is, VrS2 of a DRB corresponding to the E-RAB at the MN side or the SN side);

E-RAB identification, and RAN data volume of a duplicated part of the E-RAB (that is, Vd of a DRB corresponding to the E-RAB at the MN side or the SN side);

PDU session identification, and RAN data volume of the PDU session where a duplicated part is not counted (that is, the sum of V1 of all DRBs of the PDU session located at the at least one of the MN side or the SN side);

PDU session identification, and RAN data volume in RAT of the PDU session at the MN side where a duplicated part is not counted (that is, the sum of VrM1 of all DRBs of the PDU session located at the at least one of the MN side or the SN side);

PDU session identification, and RAN data volume in RAT of the PDU session at the SN side where a duplicated part is not counted (that is, the sum of VrS1 of all DRBs of the PDU session located at the at least one of the MN side or the SN side);

PDU session identification, and RAN data volume of the PDU session where a duplicated part is counted (that is, the sum of V2 of all DRBs of the PDU session located at the at least one of the MN side or the SN side);

PDU session identification, and RAN data volume in RAT of the PDU session at the MN side where a duplicated part is counted (that is, the sum of VrM2 of all DRBs of the PDU session located at the at least one of the MN side or the SN side);

PDU session identification, and RAN data volume in RAT of the PDU session at the SN side where a duplicated part is counted (that is, the sum of VrS2 of all DRBs of the PDU session located at the at least one of the MN side or the SN side);

PDU session identification, and RAN data volume of a duplicated part of the PDU session (that is, the sum of Vd of all DRBs of the PDU session located at the at least one of the MN side or the SN side);

QoS flow identification, and RAN data volume of the QoS flow where a duplicated part is not counted (that is, V1 of a DRB corresponding to the QoS flow at the MN side or the SN side in the case where each QoS flow corresponds to a respective DRB);

QoS flow identification, and RAN data volume in RAT of the QoS flow at the MN side where a duplicated part is not counted (that is, VrM1 of a DRB corresponding to the QoS flow at the MN side or the SN side in the case where each QoS flow corresponds to a respective DRB);

QoS flow identification, and RAN data volume in RAT of the QoS flow at the SN side where a duplicated part is not counted (that is, VrS1 of a DRB corresponding to the QoS flow at the MN side or the SN side in the case where each QoS flow corresponds to a respective DRB);

QoS flow identification, and RAN data volume of the QoS flow where a duplicated part is counted (that is, V2 of a DRB corresponding to the QoS flow at the MN side or the SN side in the case where each QoS flow corresponds to a respective DRB);

QoS flow identification, and RAN data volume in RAT of the QoS flow at the MN side where a duplicated part is counted (that is, VrM2 of a DRB corresponding to the QoS flow at the MN side or the SN side in the case where each QoS flow corresponds to a respective DRB);

QoS flow identification, and RAN data volume in RAT of the QoS flow at the SN side where a duplicated part is counted (that is, VrS2 of a DRB corresponding to the QoS flow at the MN side or the SN side in the case where each QoS flow corresponds to a respective DRB);

QoS flow identification, and RAN data volume of a duplicated part of the QoS flow (that is, Vd of a DRB corresponding to the QoS flow at the MN side or the SN side in the case where each QoS flow corresponds to a respective DRB);

a QoS flow identification list, and RAN data volume of the QoS flow group (that is, the QoS flow group the QoS flow identification list indicates) where a duplicated part is not counted (that is, V1 of a DRB corresponding to the QoS flow group at the MN side or the SN side in the case where each DRB corresponds to multiple QoS flows);

a QoS flow identification list, and RAN data volume in RAT of the QoS flow group at the MN side where a duplicated part is not counted (that is, VrM1 of a DRB corresponding to the QoS flow group at the MN side or the SN side in the case where each DRB corresponds to multiple QoS flows);

a QoS flow identification list, and RAN data volume in RAT of the QoS flow group at the SN side where a duplicated part is not counted (that is, VrS1 of a DRB corresponding to the QoS flow group at the MN side or the SN side in the case where each DRB corresponds to multiple QoS flows);

a QoS flow identification list, and RAN data volume of the QoS flow group where a duplicated part is counted (that is, V2 of a DRB corresponding to the QoS flow group at the MN side or the SN side in the case where each DRB corresponds to multiple QoS flows);

a QoS flow identification list, and RAN data volume in RAT of the QoS flow group at the MN side where a duplicated part is counted (that is, VrM2 of a DRB corresponding to the QoS flow group at the MN side or the SN side in the case where each DRB corresponds to multiple QoS flows);

a QoS flow identification list, and RAN data volume in RAT of the QoS flow group at the SN side where a duplicated part is counted (that is, VrS2 of a DRB corresponding to the QoS flow group at the MN side or the SN side in the case where each DRB corresponds to multiple QoS flows); or a QoS flow identification list, and RAN data volume of a duplicated part of the QoS flow group (that is, Vd of a DRB corresponding to the QoS flow group at the MN side or the SN side in the case where each DRB corresponds to multiple QoS flows).

In another embodiment, if the MN and the SN are both a 4G node or a 5G node, the RAN data volume report includes at least one of:

UE identification, and RAN data volume of the UE where a duplicated part is not counted (that is, the sum of V1 of all DRBs of the UE at the MN side and the SN side);

UE identification, and RAN data volume of the UE where a duplicated part is counted (that is, the sum of V2 of all DRBs of the UE at the MN side and the SN side);

UE identification, and RAN data volume of a duplicated part of the UE (that is, the sum of Vd of all DRBs of the UE at the MN side and the SN side);

E-RAB identification, and RAN data volume of the E-RAB where a duplicated part is not counted (that is, V1 of a DRB corresponding to the E-RAB at the MN side or the SN side);

E-RAB identification, and RAN data volume of the E-RAB where a duplicated part is counted (that is, V2 of a DRB corresponding to the E-RAB at the MN side or the SN side);

E-RAB identification, and RAN data volume of a duplicated part of the E-RAB (that is, Vd of a DRB corresponding to the E-RAB at the MN side or the SN side);

PDU session identification, and RAN data volume of the PDU session where a duplicated part is not counted (that is, the sum of V1 of all DRBs of the PDU session located at the at least one of the MN side or the SN side);

PDU session identification, and RAN data volume of the PDU session where a duplicated part is counted (that is, the sum of V2 of all DRBs of the PDU session located at the at least one of the MN side or the SN side);

PDU session identification, and RAN data volume of a duplicated part of the PDU session (that is, the sum of Vd of all DRBs of the PDU session located at the at least one of the MN side or the SN side);

QoS flow identification, and RAN data volume of the QoS flow where a duplicated part is not counted (that is, V1 of a DRB corresponding to the QoS flow at the MN side or the SN side in the case where each QoS flow corresponds to a respective DRB);

QoS flow identification, and RAN data volume of the QoS flow where a duplicated part is counted (that is, V2 of a DRB corresponding to the QoS flow at the MN side or the SN side in the case where each QoS flow corresponds to a respective DRB);

QoS flow identification, and RAN data volume of a duplicated part of the QoS flow (that is, Vd of a DRB corresponding to the QoS flow at the MN side or the SN side in the case where each QoS flow corresponds to a respective DRB);

a QoS flow identification list, and RAN data volume of the QoS flow group (that is, the QoS flow group the QoS flow identification list indicates) where a duplicated part is not counted (that is, V1 of a DRB corresponding to the QoS flow group at the MN side or the SN side in the case where each DRB corresponds to multiple QoS flows);

a QoS flow identification list, and RAN data volume of the QoS flow group where a duplicated part is counted (that is, V2 of a DRB corresponding to the QoS flow group at the MN side or the SN side in the case where each DRB corresponds to multiple QoS flows);

a QoS flow identification list, and RAN data volume of a duplicated part of the QoS flow group (that is, Vd of a DRB corresponding to the QoS flow group at the MN side or the SN side in the case where each DRB corresponds to multiple QoS flows).

In an embodiment, in a case where the secondary node includes a central unit control plane of the secondary node, and a central unit user plane of the secondary node:

The step in which the secondary node acquires the information about each PDCP at the secondary node side includes the step described below.

The central unit user plane of the secondary node acquires information about each PDCP at the secondary node side, the information includes: data volume of the PDCP PDU or the PDCP SDU generated by the PDCP, data volume of the PDCP PDU or the PDCP SDU issued by the PDCP to the radio link control of the master node side, and data volume of the PDCP PDU or PDCP SDU issued by the PDCP to the radio link control of the secondary node side.

The step in which the secondary node generates the first radio access network data volume report and sends the first radio access network data volume report to the master node includes the steps described below.

The central unit user plane of the secondary node generates the first radio access network data volume report and sends the first radio access network data volume report to the central unit control plane of the secondary node. The central unit control plane of the secondary node sends the first radio access network data volume report to the master node.

In an embodiment, in case where the secondary node includes the central unit control plane of the secondary node and the central unit user plane of the secondary node, the CN or the OAM sends configuration information to the MN, the MN sends the configuration information to the central unit control plane of the node, and the central unit control plane of the secondary node sends the configuration information to the central unit user plane of the secondary node.

The RAN data volume report may be carried by a message at an existing interface between the CN and the node, such as an S1 or an NG, or by a message at a new interface between the CN and the node.

2. In the case of carrier aggregation

In an embodiment, the node further receives configuration information sent by the OAM or the CN. The configuration information includes at least one of: an indication whether the duplicated part is counted into the radio access network data volume report in duplication transmission, information about radio access technology into which data volume is counted in duplication transmission, or granularity unit information. The configuration information further includes at least one of: UE identification, E-RAB identification, PDU session identification or QoS flow identification.

In an embodiment, the node performs the statistics for each DRB. If data volume of a PDCP PDU generated by a PDCP is V, and the sum of data volume of PDCP PDUs issued by the PDCP to all RLC is Vr, then RAN data volume V1 where a duplicated part is not counted satisfies that V1=V, RAN data volume Vd of the duplicated part satisfies that Vd=Vr−V, and RAN data volume V2 where the duplicated part is not counted satisfies that V2=Vr.

In an embodiment, the RAN data volume report includes at least one of:

UE identification, and RAN data volume of the UE where a duplicated part is not counted (that is, the sum of V1 of all DRBs of the UE);

UE identification, and RAN data volume of the UE where a duplicated part is counted (that is, the sum of V2 of all DRBs of the UE);

UE identification, and RAN data volume of a duplicated part of the UE (that is, the sum of Vd of all DRBs of the UE);

E-RAB identification, and RAN data volume of the E-RAB where a duplicated part is not counted (that is, V1 of a DRB corresponding to the E-RAB);

E-RAB identification, and RAN data volume of the E-RAB where a duplicated part is counted (that is, V2 of a DRB corresponding to the E-RAB);

E-RAB identification, and RAN data volume of the E-RAB (that is, Vd of a DRB corresponding to the E-RAB);

PDU session identification, and RAN data volume of the PDU session where a duplicated part is not counted (that is, the sum of V1 of all DRBs of the PDU session);

PDU session identification, and RAN data volume of the PDU session where a duplicated part is counted (that is, the sum of V2 of all DRBs of the PDU session);

PDU session identification, and RAN data volume of a duplicated part of the PDU session (that is, the sum of Vd of all DRBs of the PDU session);

QoS flow identification, and RAN data volume of the QoS flow where a duplicated part is not counted (that is, V1 of a DRB corresponding to the QoS flow in the case where each QoS flow corresponds to a respective DRB);

QoS flow identification, and RAN data volume of the QoS flow where a duplicated part is counted (that is, V2 of a DRB corresponding to the QoS flow in the case where each QoS flow correspond to a respective DRB);

QoS flow identification, and RAN data volume of a duplicated part of the QoS flow (that is, Vd of a DRB corresponding to the QoS flow in the case where each QoS flow correspond to a respective DRB);

a QoS flow identification list, and RAN data volume of the QoS flow group where a duplicated part is not counted (that is, V1 of a DRB corresponding to the QoS flow group in the case where each DRB corresponds to multiple QoS flows);

a QoS flow identification list, and RAN data volume of the QoS flow group where a duplicated part is counted (that is, V2 of a DRB corresponding to the QoS flow group in the case where each DRB corresponds to multiple QoS flows);

a QoS flow identification list, and RAN data volume of a duplicated part of the QoS flow group (that is, Vd of a DRB corresponding to the QoS flow group in the case where each DRB corresponds to multiple QoS flows).

When the configuration information is received by the node, the node may generate an RAN data volume report according to the indication in the configuration information. For example, in the case where the granularity unit is the UE and the configuration information carries an indication of the duplicated part is not counted into the radio access network data volume report in duplication transmission, the RAN data volume report includes UE identification, and RAN data volume of the UE where a duplicated part is not counted (that is, the sum of V1 of all DRBs of the UE).

In an embodiment, the node includes a central unit control plane of the node, and a central unit user plane of the node.

The step in which the node acquires data volume information about the data radio bearer includes that the central unit user plane of the node acquires the following information about each PDCP: the data volume of the PDCP PDU or the PDCP SDU generated by the each PDCP, and the data volume of the PDCP PDU or the PDCP issued by the each PDCP to the radio link control.

The step in which the node generates the radio access network data volume report according to the data volume information about the data radio bearer includes that the central unit user plane of the node generates the radio access network data volume, and sends the radio access network data volume report to the central unit control plane of the node.

The step in which the node sends the radio access network data volume report to the core network includes that the central unit control plane of the node sends the radio access network data volume report to the core network.

Additionally, the CN or the OAM sends the configuration information to the central unit control plane of the node, and then, the central unit control plane of the node sends the configuration information to the central unit user plane of the node.

Compared with the existing solution, at least one embodiment of the present application provides a radio access network data volume report solution in duplication transmission to satisfy the needs of operators.

Embodiment 2

Figure 2:
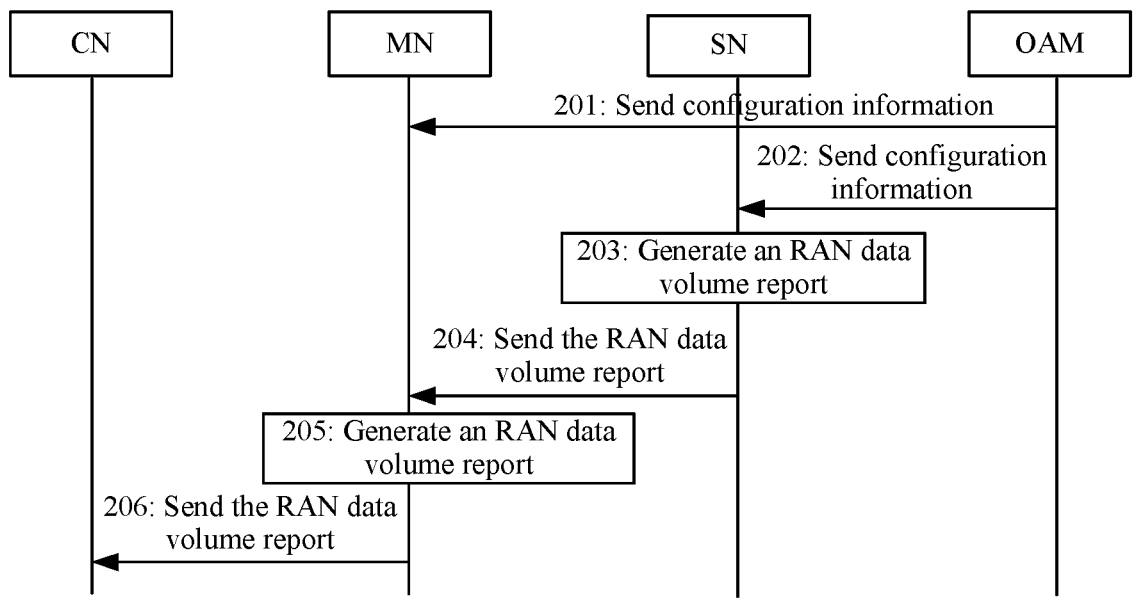
FIG. 2 is a flowchart of a radio access network data volume report method according to an embodiment of the present application.

This embodiment relates to a scenario of dual connectivity. As shown in FIG. 2, the method includes steps 201 to 206.

In step 201, network operating and maintaining (OAM) sends configuration information to an MN. The configuration information includes at least one of: an indication whether a duplicated part is counted into an RAN data volume report in duplication transmission (in the embodiment, it is assumed that the duplicated part is not counted), or information about RAT into which data volume is counted in duplication transmission (required in the case where the MN uses different RAT than an SN and the duplicated part is not counted, and in the embodiment, it is assumed that the MN uses 4G RAT, the SN uses 5G RAT, and the data volume is counted into the 5G RAT in the duplication transmission). A configuration granularity of the OAM is a node.

In step 202, the OAM sends configuration information to an SN. The configuration information includes at least one of: an indication whether a duplicated part is counted into an RAN data volume report in duplication transmission (in the embodiment, it is assumed that the duplicated part is not counted), or information about RAT into which data volume is counted in duplication transmission (required in the case where the MN uses different RAT than the SN and the duplicated part is not counted, and in the embodiment, it is assumed that the MN uses 4G RAT, the SN uses 5G RAT, and the data volume is counted into the 5G RAT in the duplication transmission). A configuration granularity of the OAM is a node.

In step 203, the SN performs the statistics for each DRB of a PDCP at an SN side. If data volume of a PDCP PDU generated by the PDCP is V, data volume of a PDCP PDU issued by the PDCP to RLC of the SN side is Vs (may be equal to 0), and data volume of a PDCP PDU issued by the PDCP to RLC of the MN side is Vm (may be equal to 0), then RAN data volume V1 where a duplicated part is not counted satisfies that V1=V, RAN data volume Vd of the duplicated part satisfies that Vd=Vs+Vm−V, 5G data volume VrS where a duplicated part is not counted satisfies that VrS=Vs, and 4G data volume VrM where a duplicated part is not counted satisfies that VrM=Vm−Vd.

In step 204, the SN sends an RAN data volume report to the MN. The RAN data volume report includes at least one of: V1 of each DRB of the PDCP at the SN side, VrS of each DRB of the PDCP at the SN side or VrM of each DRB of the PDCP at the SN side.

In step 205, the MN performs the statistics for each DRB of a PDCP at the MN side. If data volume of a PDCP PDU generated by the PDCP is V, data volume of a PDCP PDU issued by the PDCP to RLC of the MN side is Vm (may be equal to 0), and data volume of a PDCP PDU issued by the PDCP to RLC of the SN side is Vs (may be equal to 0), then RAN data volume V1 where a duplicated part is not counted satisfies that V1=V, RAN data volume Vd of the duplicated part satisfies that Vd=Vs+Vm−V, 4G data volume VrM where a duplicated part is not counted satisfies that VrM=Vm−Vd, and 5G data volume VrS where a duplicated part is not counted satisfies that VrS=Vs.

In step 206, the MN sends an RAN data volume report to the CN. The RAN data volume report includes at least one of the following information for each DRB (where the PDCP is located at the at least one of the MN side or the SN side):

A respective E-RAB identification corresponding to the each DRB, V1, VrS or VrM.

That is, the RAN data volume report includes a list. The list includes data volume information about E-RABs corresponding to all DRBs (of the PDCP at the MN side or the SN side) of a certain UE. An item in the list indicates that data volume information about a certain E-RAB, where the item includes E-RAB identification, VrS and VrM.

Additionally, the data volume statistics may be performed for a PDCP SDU. That is, data volume of the PDCP SDU is obtained by subtracting the overheads of a PDCP header in the data volume statistics. That is, PDCP SDU=PDCP PDU−PDCP header.

Embodiment 3

Figure 3:
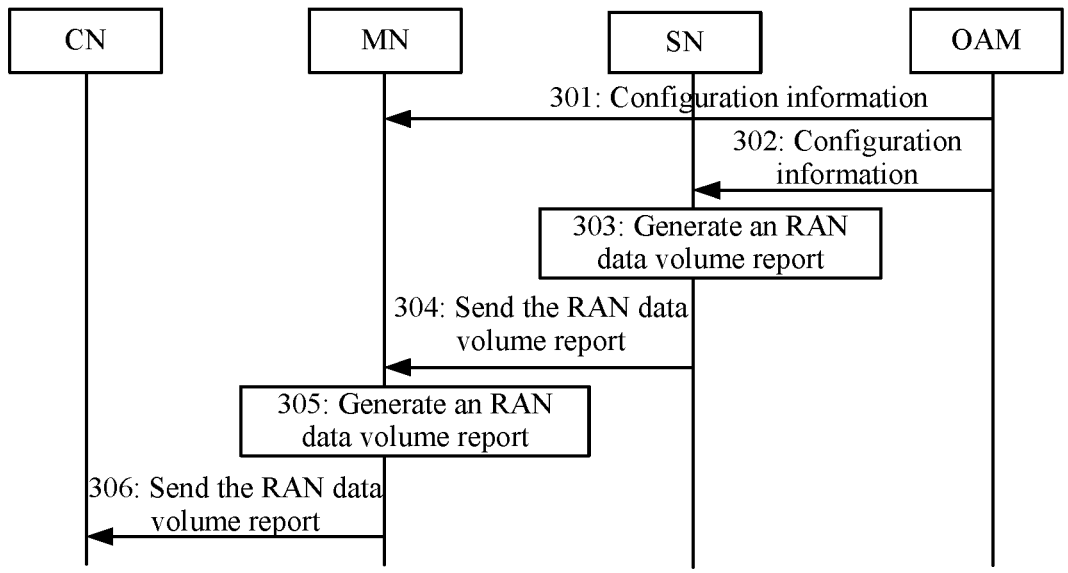
FIG. 3 is a flowchart of a radio access network data volume report method according to an embodiment of the present application.

This embodiment relates to an implementation in a scenario of dual connectivity. As shown in FIG. 3, the method includes steps 301 to 306.

In step 301, OAM sends configuration information to an MN. The configuration information includes at least one of an indication whether a duplicated part is counted into an RAN data volume report in duplication transmission (in the embodiment, it is assumed that the duplicated part is counted). In the embodiment, it is assumed that the MN uses 4G RAT, and an SN uses 5G RAT. A configuration granularity of the OAM is a node.

In step 302, the OAM sends configuration information to the SN. The configuration information includes at least one of an indication whether a duplicated part is counted into an RAN data volume report in duplication transmission (in the embodiment, it is assumed that the duplicated part is counted). In the embodiment, it is assumed that the MN uses 4G RAT, and the SN uses 5G RAT. A configuration granularity of the OAM is a node.

In step 303, the SN performs the statistics for each DRB of a PDCP at an SN side. If data volume of a PDCP PDU generated by the PDCP is V, data volume of a PDCP PDU issued by the PDCP to RLC of the SN side is Vs (may be equal to 0), and data volume of a PDCP PDU issued by the PDCP to RLC of the MN side is Vm (may be equal to 0), then RAN data volume V2 where the duplicated part is not counted satisfies that V2=Vs+Vm, RAN data volume Vd of the duplicated part satisfies that Vd=Vs+Vm−V, 5G data volume VrS where the duplicated part is not counted satisfies that VrS=Vs, and 4G data volume VrM where the duplicated part is not counted satisfies that VrM=Vm.

In step 304, the SN sends an RAN data volume report to the MN. The RAN data volume report includes at least one of V1 of each DRB of the PDCP at the SN side, VrS of each DRB of the PDCP at the SN side or VrM of each DRB of the PDCP at the SN side.

In step 305, the MN performs the statistics for each DRB of a PDCP at an MN side. If data volume of a PDCP PDU generated by the PDCP is V, data volume of a PDCP PDU issued by the PDCP to RLC of the MN side is Vm (may be equal to 0), and data volume of a PDCP PDU issued by the PDCP to RLC of the SN side is Vs (may be equal to 0), then RAN data volume V2 where the duplicated part is not counted satisfies that V2=Vm+Vs, RAN data volume Vd of the duplicated part satisfies that Vd=Vm+Vs−V, 4G data volume VrM where the duplicated part is not counted satisfies that VrM=Vm, and 5G data volume VrS where the duplicated part is not counted satisfies that VrS=Vs.

In step 306, the MN sends an RAN data volume report to the CN. The RAN data volume report includes at least one of: a respective E-RAB identification corresponding to the each DRB, V1 of the each DRB, VrS of the each DRB or VrM of the each DRB (where the PDCP is located at the at least one of the MN side or the SN side).

Additionally, the data volume statistics may be performed for a PDCP SDU, in which the overheads of a PDCP header are subtracted in the data volume statistics.

Embodiment 4

Figure 4:
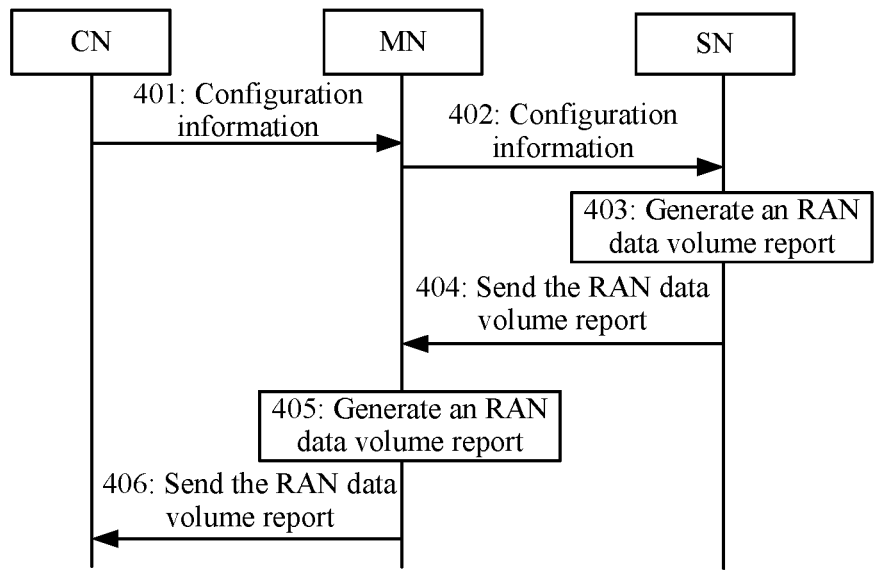
FIG. 4 is a flowchart of a radio access network data volume report method according to an embodiment of the present application.

This embodiment relates to a scenario of dual connectivity. As shown in FIG. 4, the method includes steps 401 to 406.

In step 401, a CN sends configuration information to an MN.

The configuration information includes at least one of UE identification, E-RAB identification, an indication whether a duplicated part is counted into an RAN data volume report in duplication transmission (in the embodiment, it is assumed that the duplicated part is not counted), or information about RAT into which data volume is counted in duplication transmission (required in the case where the MN uses different RAT than an SN and a duplicated part is not counted, and in the embodiment, it is assumed that the MN uses 4G RAT, the SN uses 5G RAT, and the data volume is counted into the 5G RAT in the duplication transmission). A configuration granularity of the CN may be a UE or an E-RAB (in the embodiment, it is assumed that the configuration granularity is the E-RAB, and for each E-RAB, it is configured that the duplicated part is not counted).

In step 402, the MN sends configuration information to the SN. The configuration information includes at least one of UE identification, E-RAB identification, an indication whether a duplicated part is counted into an RAN data volume report in duplication transmission (in the embodiment, it is assumed that the duplicated part is not counted), or information about RAT into which data volume is counted in duplication transmission (required in the case where the MN uses different RAT than the SN and a duplicated part is not counted, and in the embodiment, it is assumed that the MN uses 4G RAT, the SN uses 5G RAT, and the data volume is counted into the 5G RAT in the duplication transmission).

In step 403, the SN performs the statistics for each DRB of a PDCP at an SN side. If data volume of a PDCP PDU generated by the PDCP is V, data volume of a PDCP PDU issued by the PDCP to RLC of the SN side is Vs (may be equal to 0), and data volume of a PDCP PDU issued by the PDCP to RLC of an MN side is Vm (may be equal to 0), then RAN data volume V1 where a duplicated part is not counted satisfies that V1=V, RAN data volume Vd of a duplicated part satisfies that Vd=Vs+Vm−V, 5G data volume VrS where a duplicated part is not counted satisfies that VrS=Vs, and 4G data volume VrM where a duplicated part is not counted satisfies that VrM=Vm−Vd.

In step 404, the SN sends an RAN data volume report to the MN. The RAN data volume report includes at least one of V1 of each DRB of the PDCP at the SN side, VrS of each DRB of the PDCP at the SN side or VrM of each DRB of the PDCP at the SN side.

In step 405, the MN performs the statistics for each DRB of a PDCP at the MN side. If data volume of a PDCP PDU generated by the PDCP is V, data volume of a PDCP PDU issued by the PDCP to RLC of the MN side is Vm (may be equal to 0), and data volume of a PDCP PDU issued by the PDCP to RLC of the SN side is Vs (may be equal to 0), then RAN data volume V1 where a duplicated part is not counted satisfies that V1=V, RAN data volume Vd of a duplicated part satisfies that Vd=Vm+Vs−V, 4G data volume VrM where a duplicated part is not counted satisfies that VrM=Vm−Vd, and 5G data volume VrS where a duplicated part is not counted satisfies that VrS=Vs.

In step 406, the MN sends an RAN data volume report to the CN. The RAN data volume report includes at least one of: a respective E-RAB identification corresponding to the each DRB, V1 of the each DRB, VrS of the each DRB or VrM of the each DRB (where the PDCP is located at the at least one of the MN side or the SN side).

Additionally, the data volume statistics may be performed for a PDCP SDU, in which the overheads of a PDCP header are subtracted in the data volume statistics.

Embodiment 5

Figure 5:
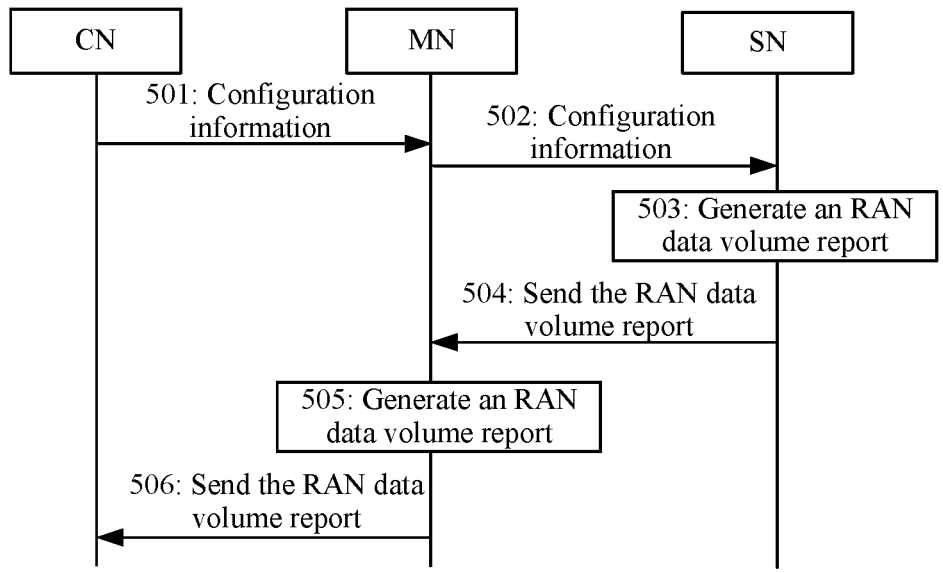
FIG. 5 is a flowchart of a radio access network data volume report method according to an embodiment of the present application.

This embodiment relates to a scenario of dual connectivity, assuming that an MV uses 4G RAT and an SN uses 5G RAT. As shown in FIG. 5, the method includes steps 501 to 506.

In step 501, a CN sends configuration information to the MN. The configuration information includes at least one of UE identification, E-RAB identification, or an indication whether a duplicated part is counted into an RAN data volume report in duplication transmission (in the embodiment, it is assumed that the duplicated part is counted). A configuration granularity of the CN may be a UE or an E-RAB (in the embodiment, it is assumed that the configuration granularity is the E-RAB, and for each E-RAB, it is configured that the duplicated part is counted).

In step 502, the MN sends configuration information to the SN. The configuration information includes at least one of UE identification, E-RAB identification, or an indication whether a duplicated part is counted into an RAN data volume report in duplication transmission (in the embodiment, it is assumed that the duplicated part is counted).

In step 503, the SN performs the statistics for each DRB of a PDCP at an SN side. If data volume of a PDCP PDU generated by the PDCP is V, data volume of a PDCP PDU issued by the PDCP to RLC of the SN side is Vs (may be equal to 0), and data volume of a PDCP PDU issued by the PDCP to RLC of the MN side is Vm (may be equal to 0), then RAN data volume V2 where a duplicated part is counted satisfies that V2=Vs+Vm, RAN data volume Vd of the duplicated part satisfies that Vd=Vs+Vm−V, 5G data volume VrS where the duplicated part is not counted satisfies that VrS=Vs, and 4G data volume VrM where the duplicated part is not counted satisfies that VrM=Vm.

In step 504, the SN sends an RAN data volume report to the MN. The RAN data volume report includes at least one of V2 of each DRB of the PDCP at the SN side, VrS of each DRB of the PDCP at the SN side or VrM of each DRB of the PDCP at the SN side.

In step 505, the MN performs the statistics for each DRB of a PDCP at an MN side. If data volume of a PDCP PDU generated by the PDCP is V, data volume of a PDCP PDU issued by the PDCP to RLC of the MN side is Vm (may be equal to 0), and data volume of a PDCP PDU issued by the PDCP to RLC of the SN side is Vs (may be equal to 0), then RAN data volume V2 where a duplicated part is counted satisfies that V2=Vm+Vs, RAN data volume Vd of the duplicated part satisfies that Vd=Vm+Vs−V, 4G data volume VrM where the duplicated part is not counted satisfies that VrM=Vm, and 5G data volume VrS where the duplicated part is not counted satisfies that VrS=Vs.

In step 506, the MN sends an RAN data volume report to the CN. The RAN data volume report includes at least one of: a respective E-RAB identification corresponding to the each DRB, V2 of the each DRB, VrS of the each DRB or VrM of the each DRB (where the PDCP is located at the at least one of the MN side or the SN side).

Additionally, the data volume statistics may be performed for a PDCP SDU, in which overheads of a PDCP header are subtracted in the data volume statistics.

Embodiment 6

Figure 6:
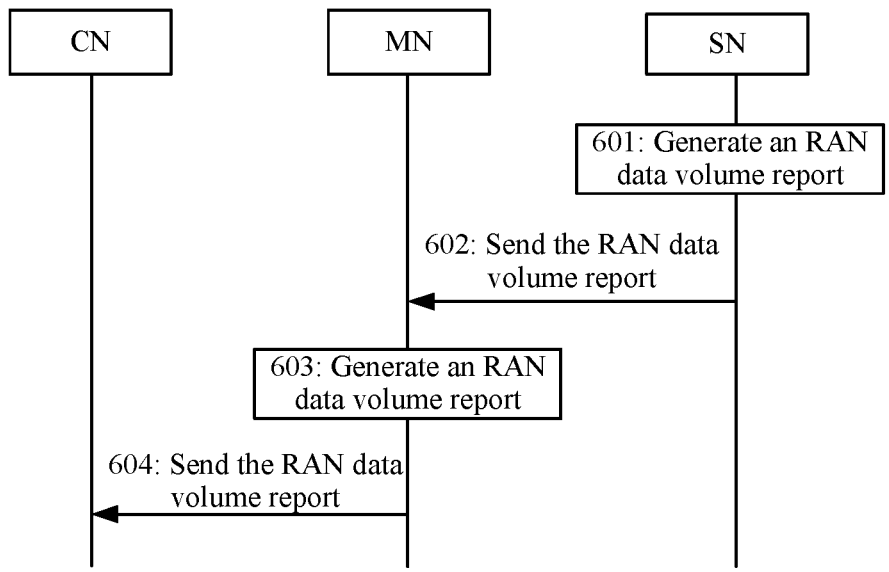
FIG. 6 is a flowchart of a radio access network data volume report method according to an embodiment of the present application.

This embodiment relates to a scenario of dual connectivity, assuming that an MV uses 4G RAT and an SN uses 5G RAT. As shown in FIG. 6, the method includes steps 601 to 604.

In step 601, the SN performs the statistics for each DRB of a PDCP at an SN side. If data volume of a PDCP PDU generated by the PDCP is V, data volume of a PDCP PDU issued by the PDCP to RLC of the SN side is Vs (may be equal to 0), and data volume of a PDCP PDU issued by the PDCP to RLC of an MN side is Vm (may be equal to 0), then RAN data volume V1 where a duplicated part is not counted satisfies that V1=V, RAN data volume Vd of a duplicated part satisfies that Vd=Vs+Vm−V, and RAN data volume V2 where the duplicated part is not counted satisfies that V2=Vs+Vm.

In step 602, the SN sends an RAN data volume report to the MN. The RAN data volume report includes at least one of: V1 of each DRB of the PDCP at the SN side, V2 of each DRB of the PDCP at the SN side, Vd of each DRB of the PDCP at the SN side, Vs of each DRB of the PDCP at the SN side or Vm of each DRB of the PDCP at the SN side.

In step 603, the MN performs the statistics for each DRB of a PDCP at the MN side. If data volume of a PDCP PDU generated by the PDCP is V, data volume of a PDCP PDU issued by the PDCP to RLC of the MN side is Vm (may be equal to 0), and data volume of a PDCP PDU issued by the PDCP to RLC of the SN side is Vs (may be equal to 0), then RAN data volume V1 where a duplicated part is not counted satisfies that V1=V, RAN data volume Vd of a duplicated part satisfies that Vd=Vs+Vm−V, and RAN data volume V2 where the duplicated part is not counted satisfies that V2=Vm+Vs.

In step 604, the MN sends an RAN data volume report to the CN. The RAN data volume report includes at least one of E-RAB identification, V1, V2, Vd, Vs or Vm of each DRB (of the PDCP located at the at least one of the MN side or the SN side). Each DRB corresponds to respective E-RAB identification, V1, V2, Vd, Vs or Vm. The RAN data volume report includes at least one: a respective E-RAB identification corresponding to the each DRB, V1 of the each DRB, V2 of the each DRB, Vd of the each DRB, Vs of the each DRB or Vm of the each DRB (where the PDCP is located at the at least one of the MN side or the SN side).

That is, the RAN data volume report includes a list. The list includes data volume information about E-RABs corresponding to all DRBs (of the PDCP at the MN side or the SN side) of a certain UE. An item in the list indicates that data volume information about a certain E-RAB, where the item includes E-RAB identification, Vd, Vs and Vm.

Additionally, the data volume statistics may be performed for a PDCP SDU, in which overheads of a PDCP header are subtracted in the data volume statistics.

Embodiment 7

Figure 7:
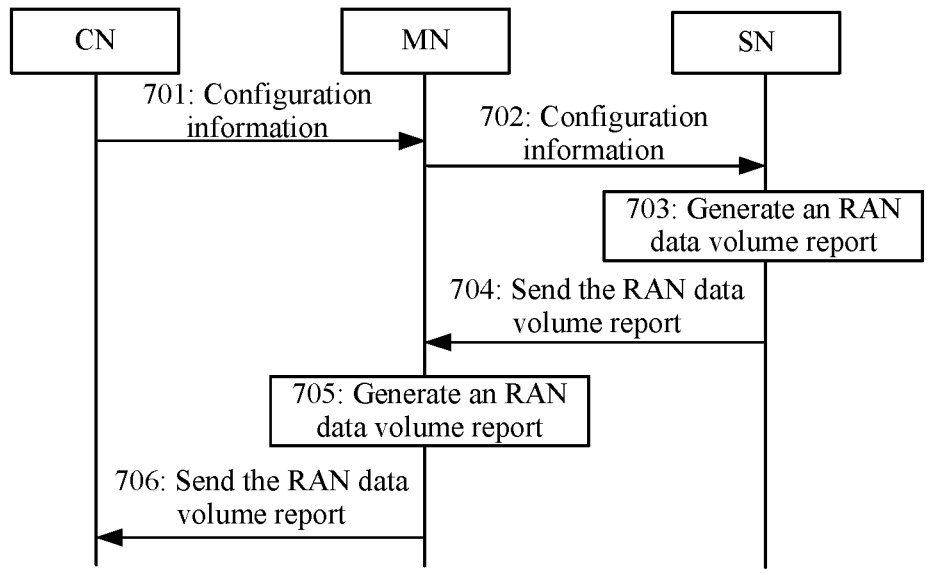
FIG. 7 is a flowchart of a radio access network data volume report method according to an embodiment of the present application.

This embodiment relates to a scenario of dual connectivity. As shown in FIG. 7, the method includes steps 701 to 706.

In step 701, a CN sends configuration information to an MN. The configuration information includes at least one of UE identification, PDU session identification, QoS flow identification, an indication whether a duplicated part is counted into an RAN data volume report in duplication transmission (in the embodiment, it is assumed that the duplicated part is not counted), or information about RAT into which data volume is counted in duplication transmission (required in the case where the MN uses different RAT than an SN and the duplicated part is not counted, and in the embodiment, it is assumed that the MN uses 4G RAT, the SN uses 5G RAT, and the data volume is counted into the 5G RAT in the duplication transmission). A configuration granularity of the CN may be a UE, a PDU session or a QoS flow (in the embodiment, it is assumed that the configuration granularity is the PDU session).

In step 702, the MN sends configuration information to the SN. The configuration information includes at least one of UE identification, PDU session identification, QoS flow identification, an indication whether a duplicated part is counted into an RAN data volume report in duplication transmission (in the embodiment, it is assumed that the duplicated part is not counted), or information about RAT into which data volume is counted in duplication transmission (required in the case where the MN uses different RAT than the SN and the duplicated part is not counted, and in the embodiment, it is assumed that the MN uses 4G RAT, the SN uses 5G RAT, and the data volume is counted into the 5G RAT in the duplication transmission).

In step 703, the SN performs the statistics for each DRB of a PDCP at an SN side. If data volume of a PDCP PDU generated by the PDCP is V, data volume of a PDCP PDU issued by the PDCP to RLC of the SN side is Vs (may be equal to 0), and data volume of a PDCP PDU issued by the PDCP to RLC of the MN side is Vm (may be equal to 0), then RAN data volume V1 where a duplicated part is not counted satisfies that V1=V, RAN data volume Vd of the duplicated part satisfies that Vd=Vs+Vm−V, and 5G data volume VrM where a duplicated part is not counted satisfies that VrM=Vm.

In step 704, the SN sends an RAN data volume report to the MN. The RAN data volume report includes at least one piece of the following information about each PDU session at the SN side: PDU session identification, the sum of V1 of all DRBs of the PDU session, the sum of VrS of all DRBs of the PDU session, or the sum of VrM of all DRBs of the PDU session.

In step 705, the MN performs the statistics for each DRB of a PDCP at the MN side. If data volume of a PDCP PDU generated by the PDCP is V, data volume of a PDCP PDU issued by the PDCP to RLC of the MN side is Vm (may be equal to 0), and data volume of a PDCP PDU issued by the PDCP to RLC of the SN side is Vs (may be equal to 0), then RAN data volume V1 where a duplicated part is not counted satisfies that V1=V, RAN data volume Vd of a duplicated part satisfies that Vd=Vm+Vs−V, 5G data volume VrM where a duplicated part is not counted satisfies that VrM=Vm, and 4G data volume VrS where a duplicated part is not counted satisfies that VrS=Vs−Vd.

In step 706, the MN sends an RAN data volume report to the CN. The RAN data volume report includes at least one piece of the following information about each PDU session (where the each PDU session is located at the at least one of the MN side or the SN side): PDU session identification, the sum of V1 of all DRBs of the each PDU session, the sum of VrS of all DRBs of the each PDU session, or the sum of VrM of all DRBs of the each PDU session.

That is, the RAN data volume report includes a list. The list includes data volume information about all PDU sessions (at the MN side and the SN side) of a certain UE. An item in the list indicates that data volume information about a certain PDU session, where the item includes PDU session identification, 4G data volume of the PDU session where a duplicated part is not counted, that is, the sum of VrS of all DRBs of the PDU session, and 5G data volume of the PDU session where a duplicated part is not counted, that is, the sum of VrM of all DRBs of the PDU session.

Additionally, the data volume statistics may be performed for a PDCP SDU, in which the overheads of a PDCP header are subtracted in the data volume statistics.

Embodiment 8

Figure 8:
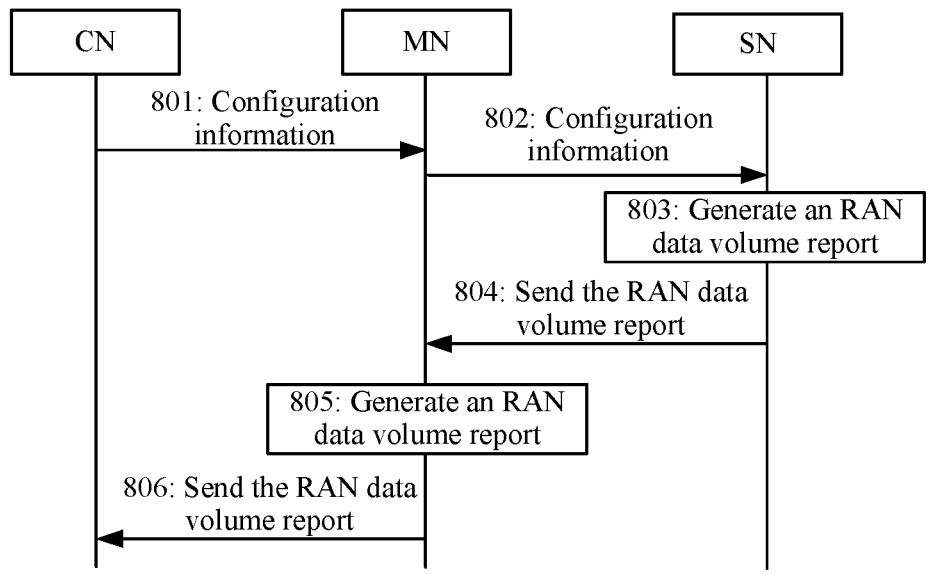
FIG. 8 is a flowchart of a radio access network data volume report method according to an embodiment of the present application.

This embodiment relates to a scenario of dual connectivity. As shown in FIG. 8, the method includes steps 801 to 806.

In step 801, a CN sends configuration information to an MN. The configuration information includes at least one of UE identification, PDU session identification, QoS flow identification, or an indication whether a duplicated part is counted into an RAN data volume report in duplication transmission (in the embodiment, it is assumed that the duplicated part is counted). A configuration granularity of the CN may be a UE, a PDU session or a QoS flow (in this embodiment, it is assumed that the configuration granularity of the CN is the PDU session).

In step 802, the MN sends configuration information to an SN. The configuration information includes at least one of UE identification, PDU session identification, QoS flow identification, or an indication whether a duplicated part is counted into an RAN data volume report in duplication transmission (in the embodiment, it is assumed that the duplicated part is counted). In the embodiment, it is assumed the MN uses 5G RAT and the SN uses 4G RAT.

In step 803, the SN performs the statistics for each DRB of a PDCP at an SN side. If data volume of a PDCP PDU generated by the PDCP is V, data volume of a PDCP PDU issued by the PDCP to RLC of the SN side is Vs (may be equal to 0), and data volume of a PDCP PDU issued by the PDCP to RLC of an MN side is Vm (may be equal to 0), then RAN data volume V2 where a duplicated part is counted satisfies that V2=Vs+Vm, RAN data volume Vd of the duplicated part satisfies that Vd=Vs+Vm−V, 4G data volume VrS where the duplicated part is not counted satisfies that VrS=Vs, and 5G data volume VrM where the duplicated part is not counted satisfies that VrM=Vm.

In step 804, the SN sends an RAN data volume report to the MN. The RAN data volume report includes at least one piece of the following information about each PDU session at the SN side: PDU session identification, the sum of V2 of all DRBs of the PDU session, the sum of VrS of all DRBs of the PDU session, or the sum of VrM of all DRBs of the PDU session.

In step 805, the MN performs the statistics for each DRB of a PDCP at the MN side. If data volume of a PDCP PDU generated by the PDCP is V, data volume of a PDCP PDU issued by the PDCP to RLC of the MN side is Vm (may be equal to 0), and data volume of a PDCP PDU issued by the PDCP to RLC of the SN side is Vs (may be equal to 0), then RAN data volume V2 where a duplicated part is counted satisfies that V2=Vm+Vs, RAN data volume Vd of the duplicated part satisfies that Vd=Vm+Vs−V, 5G data volume VrM where the duplicated part is not counted satisfies that VrM=Vm, and 4G data volume VrS where the duplicated part is not counted satisfies that VrS=Vs.

In step 806, the MN sends an RAN data volume report to the CN. The RAN data volume report includes at least one piece of the following information about each PDU session (where the PDU session is located at the at least one of the MN side or the SN side): PDU session identification, the sum of V2 of all DRBs of the each PDU session, the sum of VrS of all DRBs of the each PDU session, or the sum of VrM of all DRBs of the each PDU session.

That is, the RAN data volume report includes a list. The list includes data volume information about all PDU sessions (at the MN side and the SN side) of a certain UE. An item in the list indicates that data volume information about a certain PDU session, where the item includes PDU session identification, 4G data volume of the PDU session where a duplicated part is counted, that is, the sum of VrS of all DRBs of the PDU session, and 5G data volume of the PDU session where the duplicated part is not counted, that is, the sum of VrM of all DRBs of the PDU session.

Additionally, the data volume statistics may be performed for a PDCP SDU, in which the overheads of a PDCP header are subtracted in the data volume statistics.

Embodiment 9

Figure 9:
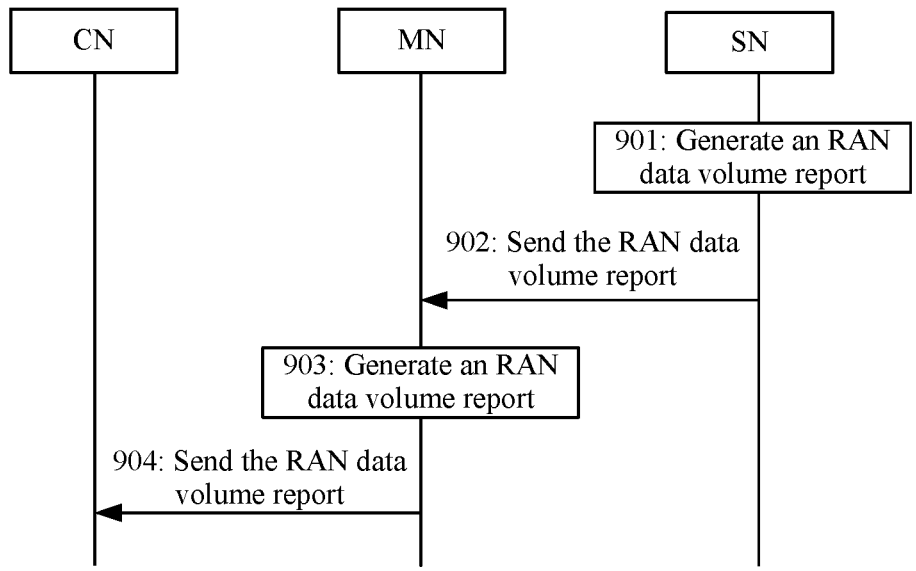
FIG. 9 is a flowchart of a radio access network data volume report method according to an embodiment of the present application.

This embodiment relates to a scenario of dual connectivity, assuming that an MV uses 5G RAT and an SN uses 4G RAT. As shown in FIG. 9, the method includes steps 901 to 904.

In step 901, the SN performs the statistics for each DRB of a PDCP at an SN side. If data volume of a PDCP PDU generated by the PDCP is V, data volume of a PDCP PDU issued by the PDCP to RLC of the SN side is Vs (may be equal to 0), and data volume of a PDCP PDU issued by the PDCP to RLC of an MN side is Vm (may be equal to 0), then RAN data volume V1 where a duplicated part is not counted satisfies that V1=V, RAN data volume Vd of a duplicated part satisfies that Vd=Vs+Vm−V, and RAN data volume V2 where the duplicated part is not counted satisfies that V2=Vs+Vm.

In step 902, the SN sends an RAN data volume report to the MN. The RAN data volume report includes at least one of V1 of each DRB of the PDCP at the SN side, V2 of each DRB of the PDCP at the SN side, Vd of each DRB of the PDCP at the SN side or Vs of each DRB of the PDCP at the SN side.

In step 903, the MN performs the statistics for each DRB of a PDCP at the MN side. If data volume of a PDCP PDU generated by the PDCP is V, data volume of a PDCP PDU issued by the PDCP to RLC of the MN side is Vm (may be equal to 0), and data volume of a PDCP PDU issued by the PDCP to RLC of an SN side is Vs (may be equal to 0), then RAN data volume V1 where a duplicated part is not counted satisfies that V1=V, RAN data volume Vd of a duplicated part satisfies that Vd=Vs+Vm−V, and RAN data volume V2 where the duplicated part is not counted satisfies that V2=Vm+Vs.

In step 904, the MN sends an RAN data volume report to the CN. The RAN data volume report includes at least one of:

UE identification, and the sum of V1 of all DRBs (at the MN side and the SN side) of the UE (where a duplicated part is not counted);

UE identification, and the sum of V2 of all DRBs (at the MN side and the SN side) of the UE (where a duplicated part is counted);

UE identification, and data volume of a duplicated part of the UE, that is, the sum of Vd of all DRBs (at the MN side and the SN side) of the UE;

PDU session identification, and the sum of V1 of all DRBs of the PDU session (where a duplicated part is not counted and the PDU session is located at the least one of the MN side and or the SN side);

PDU session identification, and the sum of V2 of all DRBs of the PDU session (where a duplicated part is counted and the PDU session is located at the at least one of the MN side and or the SN side);

PDU session identification, and RAN data volume of a duplicated part of the PDU session, that is, the sum of Vd of all DRBs of the PDU session (where the each PDU session is located at the at least one of the MN side or the SN side);

QoS flow identification, and V1 of DRBs (at the MN side or the SN side) corresponding to the QoS flow (where a duplicated part is not counted and each QoS flow corresponds to a respective DRB);

a QoS flow identification list, and V1 of a DRB (at the MN side or the SN side) corresponding to the QoS flow group (where a duplicated part is not counted and each QoS flow corresponds to a respective DRB);

QoS flow identification, and V2 of a DRB (at the MN side or the SN side) corresponding to the QoS flow (where a duplicated part is counted and each QoS flow corresponds to a respective DRB);

a QoS flow identification list, and V2 of a DRB (at the MN side or the SN side) corresponding to the QoS flow group (where a duplicated part is counted and each QoS flow corresponds to a respective DRB);

QoS flow identification, and data volume of a duplicated part of the QoS flow, that is, Vd of a DRB (at the MN side or the SN side) corresponding to the QoS flow (where each QoS flow corresponds to a respective DRB); or a QoS flow identification list, and data volume of a duplicated part of the QoS flow group, that is, Vd of a DRB (at the MN side or the SN side) corresponding to the QoS flow group (where each DRB corresponds to multiple QoS flows).

Additionally, the data volume statistics may be performed for a PDCP SDU, in which the overheads of a PDCP header are subtracted in the data volume statistics.

Embodiment 10

Figure 10:
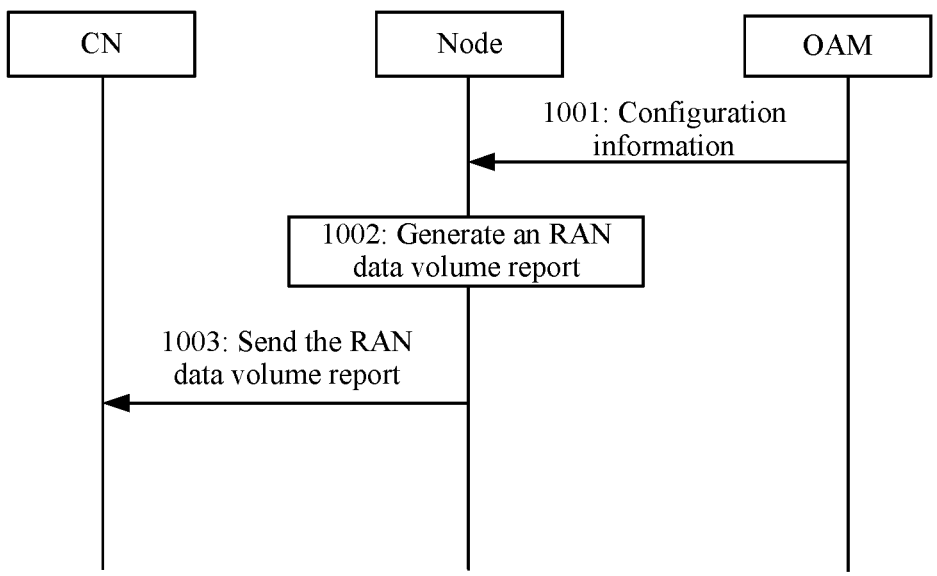
FIG. 10 is a flowchart of a radio access network data volume report method according to an embodiment of the present application.

This embodiment relates to an implementation in a scenario of carrier aggregation. As shown in FIG. 10, the method includes steps 1001 to 1003.

In step 1001, OAM sends configuration information to a node. The configuration information includes at least one of: granularity unit information, or an indication whether a duplicated part is counted into an RAN data volume report in duplication transmission. In this embodiment, a granularity unit is a node.

In an embodiment, the node performs the statistics for each DRB. If data volume of a PDCP PDU generated by a PDCP is V, and the sum of data volume of PDCP PDUs issued by the PDCP to all RLC is Vr, then RAN data volume V1 where a duplicated part is not counted satisfies that V1=V, RAN data volume Vd of a duplicated part satisfies that Vd=Vr−V, and RAN data volume V2 where the duplicated part is not counted satisfies that V2=Vr.

In step 1003, the node sends an RAN data volume report to a CN. The RAN data volume report includes E-RAB identification and V1 of each DRB (where a duplicated part is not counted), where each DRB corresponds to respective E-RAB identification and V1. Alternatively, the RAN data volume report includes E-RAB identification and V2 of each DRB (where a duplicated part is counted), where each DRB corresponds to respective E-RAB identification and V2. The RAN data volume report may further include Vd.

Additionally, the data volume statistics may be performed for a PDCP SDU, in which the overheads of a PDCP header are subtracted in the data volume statistics.

Embodiment 11

Figure 11:
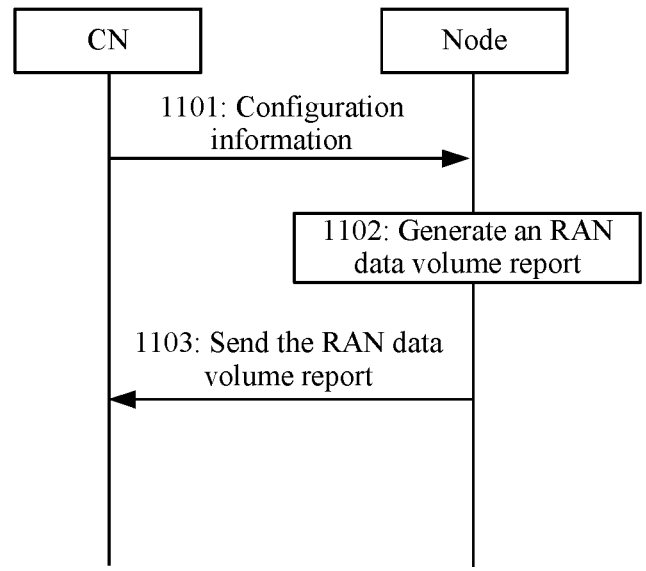
FIG. 11 is a flowchart of a radio access network data volume report method according to an embodiment of the present application.

This embodiment relates to an implementation in a scenario of carrier aggregation. As shown in FIG. 11, the method includes steps 1101 to 1103.

In step 1101, a CN sends configuration information to a node. The configuration information includes at least one of: UE identification, E-RAB identification, granularity unit information, or an indication whether a duplicated part is counted into an RAN data volume report in duplication transmission. In this embodiment, a configuration granularity of the CN may be a UE or an E-RAB, and it is assumed that the granularity unit is the E-RAB.

In step 1102, the node performs the statistics for each DRB. If data volume of a PDCP PDU generated by a PDCP is V, and the sum of data volume of PDCP PDUs issued by the PDCP to all RLC is Vr, then RAN data volume V1 where a duplicated part is not counted satisfies that V1=V, RAN data volume Vd of a duplicated part satisfies that Vd=Vr−V, and RAN data volume V2 where the duplicated part is not counted satisfies that V2=Vr.

In step 1103, the node sends an RAN data volume report to the CN. The RAN data volume report includes E-RAB identification of each DRB and V1 of the each DRB (where a duplicated part is not counted), where the each DRB corresponds to a respective E-RAB identification and V1. Alternatively, the RAN data volume report includes E-RAB identification of the each DRB and V2 of the each DRB (where the duplicated part is counted), where the each DRB corresponds to a respective E-RAB identification and V2. The RAN data volume report may further include Vd.

Additionally, the data volume statistics may be performed for a PDCP SDU, in which the overheads of a PDCP header are subtracted in the data volume statistics.

Embodiment 12

Figure 12:
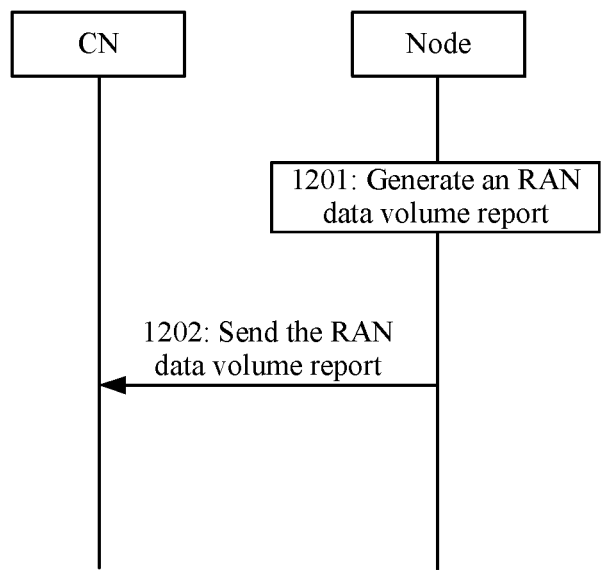
FIG. 12 is a flowchart of a radio access network data volume report method according to an embodiment of the present application.

This embodiment relates to an implementation in a scenario of carrier aggregation. As shown in FIG. 12, the method includes steps 1201 and 1202.

In step 1201, a node performs the statistics for each DRB. If data volume of a PDCP PDU generated by a PDCP is V, and the sum of data volume of PDCP PDUs issued by the PDCP to all RLC is Vr, then RAN data volume V1 where a duplicated part is not counted satisfies that V1=V, RAN data volume Vd of a duplicated part satisfies that Vd=Vr−V, and RAN data volume V2 where a duplicated part is counted satisfies that V2=Vr.

In step 1202, the node sends an RAN data volume report to a CN. The RAN data volume report includes at least one of: E-RAB identification of each DRB, V1 of the each DRB, V2 of the each DRB or Vd of the each DRB. The each DRB corresponds to a respective E-RAB identification, V1, V2 or Vd.

Additionally, the data volume statistics may be performed for a PDCP SDU, in which the overheads of a PDCP header are subtracted in the data volume statistics.

Embodiment 13

Figure 13:
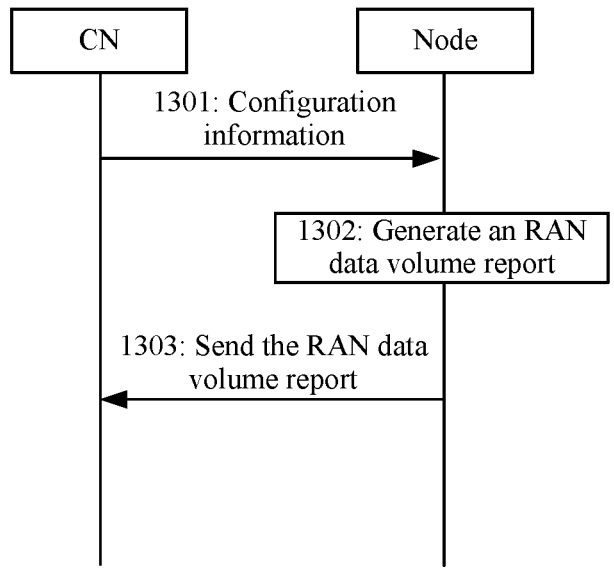
FIG. 13 is a flowchart of a radio access network data volume report method according to an embodiment of the present application.

This embodiment relates to an implementation in a scenario of carrier aggregation. As shown in FIG. 13, the method includes steps 1301 to 1303.

In step 1301, a CN sends configuration information to a node. The configuration information includes at least one of UE identification, PDU session identification, QoS flow identification, granularity unit information, or an indication whether a duplicated part is counted into an RAN data volume report in duplication transmission. A configuration granularity of the CN may be a UE, a PDU session or a QoS flow (in the embodiment, it is assumed that the configuration granularity is the PDU session).

In step 1302, the node performs the statistics for each DRB. If data volume of a PDCP PDU generated by a PDCP is V, and the sum of data volume of PDCP PDUs issued by the PDCP to all RLC is Vr, then RAN data volume V1 where a duplicated part is not counted satisfies that V1=V, RAN data volume Vd of a duplicated part satisfies that Vd=Vr−V, and RAN data volume V2 where the duplicated part is not counted satisfies that V2=Vr.

In step 1303, the node sends an RAN data volume report to the CN. The RAN data volume report includes at least one piece of the following information of each PDU session of a UE:

PDU session identification, and the sum of V1 of all DRBs of the each PDU session (in a case where the configuration information carries an indication of a duplicated part is not counted); or PDU session identification, and the sum of V2 of all DRBs of the each PDU session (in a case where the configuration information carries an indication of the duplicated part is counted).

Additionally, the data volume statistics may be performed for a PDCP SDU, in which the overheads of a PDCP header are subtracted in the data volume statistics.

Embodiment 14

Figure 14:
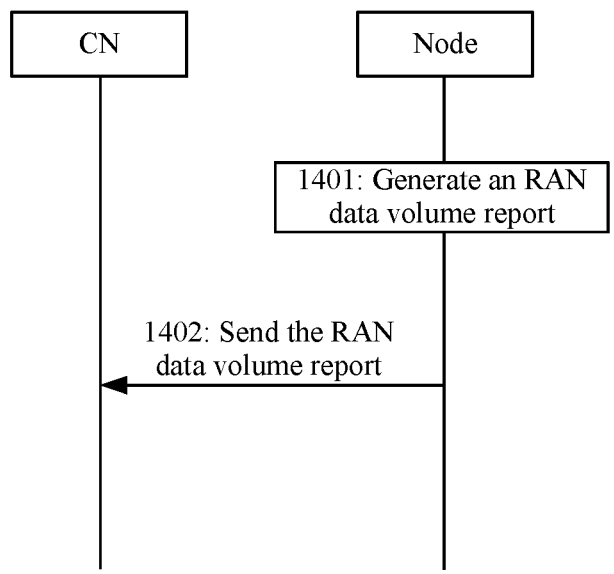
FIG. 14 is a flowchart of a radio access network data volume report method according to an embodiment of the present application.

This embodiment relates to an implementation in a scenario of carrier aggregation. As shown in FIG. 14, the method includes steps 1401 and 1402.

In step 1401, a node performs the statistics for each DRB. If data volume of a PDCP PDU generated by a PDCP is V, and the sum of data volume of PDCP PDUs issued by the PDCP to all RLC is Vr, then RAN data volume V1 where a duplicated part is not counted satisfies that V1=V, RAN data volume Vd of a duplicated part satisfies that Vd=Vr−V, and RAN data volume V2 where the duplicated part is not counted satisfies that V2=Vr.

In step 1402, the node sends an RAN data volume report to the CN. The RAN data volume report includes at least one of:

UE identification, and the sum of V1 of all DRBs of the UE (where a duplicated part is not counted);

UE identification, and the sum of V2 of all DRBs of the UE (where a duplicated part is counted);

UE identification, and data volume of a duplicated part of the UE, that is, the sum of Vd of all DRBs of the UE;

PDU session identification, and the sum of V1 of all DRBs of the PDU session (where a duplicated part is not counted);

PDU session identification, and the sum of V2 of all DRBs of the PDU session (where a duplicated part is counted);

PDU session identification, and data volume of a duplicated part of the PDU session, that is, the sum of Vd of all DRBs of the PDU session;

QoS flow identification, and V1 of a DRB corresponding to the QoS flow (where a duplicated part is not counted in the case where each QoS flow corresponds to a respective DRB);

a QoS flow identification list, and V1 of a DRB corresponding to the QoS flow group (where a duplicated part is not counted in the case where each QoS flow corresponds to a respective DRB);

QoS flow identification, and V2 of a DRB corresponding to the QoS flow (where a duplicated part is counted in the case where each QoS flow corresponds to a respective DRB);

a QoS flow identification list, and V2 of a DRB corresponding to the QoS flow group (where a duplicated part is counted in the case where each DRB corresponds to multiple QoS flows);

QoS flow identification, and data volume of a duplicated part of the QoS flow, that is, Vd of a DRB corresponding to the QoS flow (in the case where each QoS flow corresponds to a respective DRB); or a QoS flow identification list, and data volume of a duplicated part of the QoS flow group, that is, Vd of a DRB corresponding to the QoS flow group (in the case where each DRB corresponds to multiple QoS flows).

Additionally, the data volume statistics may be performed for a PDCP SDU, in which the overheads of a PDCP header are subtracted in the data volume statistics.

Embodiment 15

Figure 15:
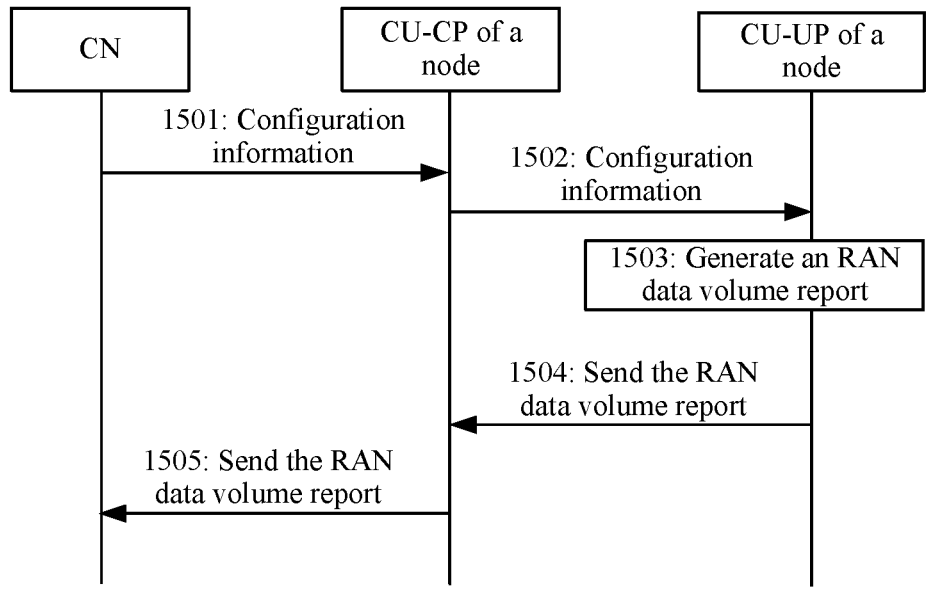
FIG. 15 is a flowchart of a radio access network data volume report method according to an embodiment of the present application.

This embodiment relates to an implementation in a scenario of carrier aggregation. As shown in FIG. 15, the method includes steps 1501 to 1505.

In step 1501, a CN sends configuration information to a central unit control plane (CU-CP) of a node. The configuration information includes at least one of UE identification, PDU session identification, QoS flow identification, granularity unit information, or an indication whether a duplicated part is counted into an RAN data volume report in duplication transmission. A configuration granularity of the CN may be a UE, a PDU session or a QoS flow (in the embodiment, it is assumed that the granularity unit is the PDU session).

In step 1502, a CU-CP of the node sends configuration information to a central unit user plane (CU-CP) of the node. The configuration information includes at least one of the UE identification, the PDU session identification, the QoS flow identification, the granularity unit information, or the indication whether the duplicated part is counted into the RAN data volume report in the duplication transmission. The configuration granularity of the CN may be the UE, the PDU session or the QoS flow (in the embodiment, it is assumed that the granularity unit is the PDU session).

In step 1503, the CU-UP of the node performs the statistics for each DRB. If data volume of a PDCP PDU generated by a PDCP is V, and the sum of data volume of PDCP PDUs issued by the PDCP to all RLC is Vr, then RAN data volume V1 where a duplicated part is not counted satisfies that V1=V, RAN data volume Vd of a duplicated part satisfies that Vd=Vr−V, and RAN data volume V2 where a duplicated part is counted satisfies that V2=Vr.

In step 1504, the CU-UP of the node sends an RAN data volume report to the CU-UP of the node. The RAN data volume report includes at least one piece of the following information about each PDU session of a UE:

PDU session identification, and the sum of V1 of all DRBs of the PDU session (in the case where the configuration information carries an indication of counting no duplicated part); or PDU session identification, and the sum of V2 of all DRBs of the PDU session (in the case where the configuration information carries an indication of counting a duplicated part).

In step 1505, the CU-CP of the node sends the RAN data volume report to the CN. The RAN data volume report includes the at least one piece of the following information of each PDU session of the UE:

the PDU session identification, and the sum of V1 of all DRBs of the PDU session (in a case where the configuration information carrying the indication of a duplicated part is not counted); or the PDU session identification, and the sum of V2 of all DRBs of the PDU session (in a case where the configuration information carrying the indication of a duplicated part is counted).

Additionally, the data volume statistics may be performed for a PDCP SDU, in which the overheads of a PDCP header are subtracted in the data volume statistics.

It is to be noted that in another embodiment, OAM may send configuration information to the CU-CP of the node. In another embodiment, the CN or the OAM may not send configuration information to the CU-CP of the node.

It is to be noted that in other embodiments, the granularity unit may be the UE, the QoS Flow or the like, and implementations of which are similar to the implementation mentioned above where the granularity unit is the PDU session, and are not described here.

Embodiment 16

Figure 16:
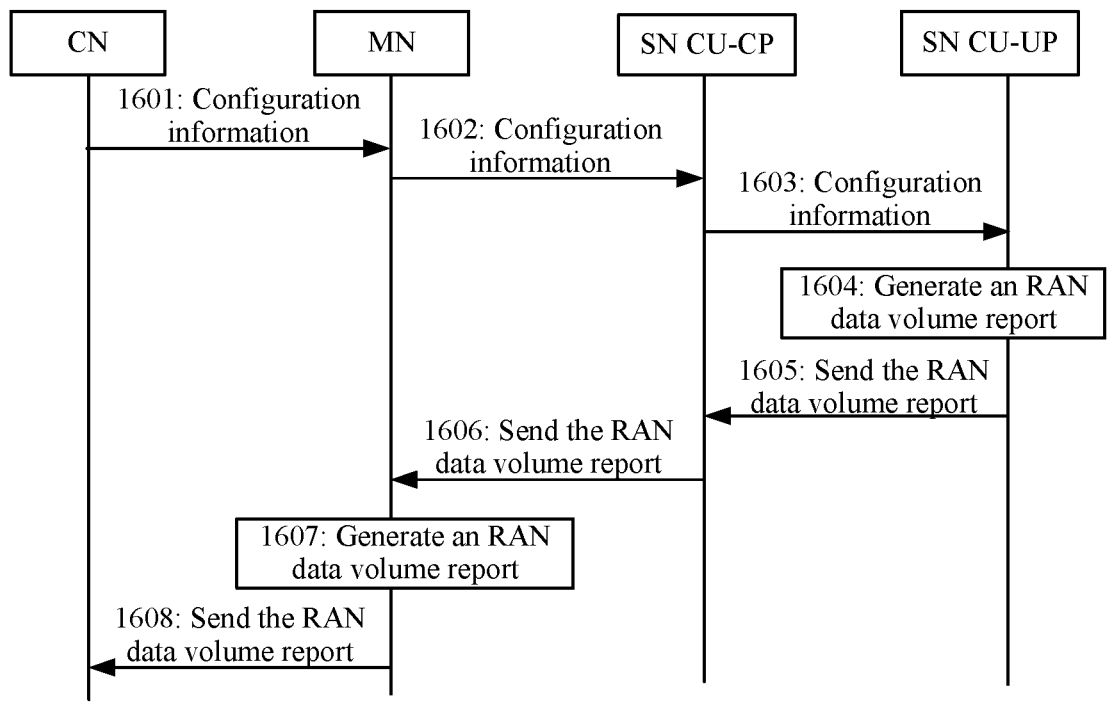
FIG. 16 is a flowchart of a radio access network data volume report method according to an embodiment of the present application.

As shown in FIG. 16, the method includes steps 1601 to 1608.

In step 1601, a CN sends configuration information to an MN.

The configuration information includes at least one of: UE identification, E-RAB identification, an indication whether a duplicated part is counted into an RAN data volume report in duplication transmission (in the embodiment, it is assumed that the duplicated part is not counted), or information about RAT into which data volume is counted in duplication transmission (required in a case where the MN uses different RAT than an SN and the duplicated part is not counted, and in this embodiment, it is assumed that the MN uses 4G RAT, the SN uses 5G RAT, and the data volume is counted into the 5G RAT in the duplication transmission). A configuration granularity of the CN may be a UE or an E-RAB (in the embodiment, it is assumed that the configuration granularity is the E-RAB, and for each E-RAB, it is configured that the duplicated part is not counted).

In step 1602, the MN sends configuration information to a central unit control plane (CU-CP) of the SN. The configuration information includes at least one of UE identification, E-RAB identification, an indication whether a duplicated part is counted into an RAN data volume report in duplication transmission (in the embodiment, it is assumed that the duplicated part is not counted), or information about RAT into which data volume is counted in duplication transmission (required in the case where the MN uses different RAT than the SN and a duplicated part is not counted, and in the embodiment, it is assumed that the MN uses 4G RAT, the SN uses 5G RAT, and the data volume is counted into the 5G RAT in the duplication transmission).

In step 1603, the CU-CP of the SN sends the configuration information to a central unit user plane (CU-UP) of the SN. The configuration information includes the at least one of the UE identification, the E-RAB identification, the indication whether the duplicated part is counted into the RAN data volume report in the duplication transmission (in the embodiment, it is assumed that the duplicated part is not counted), or the information about the RAT into which the data volume is counted in the duplication transmission (required in the case where the MN uses different RAT than the SN and the duplicated part is not counted, and in the embodiment, it is assumed that the MN uses 4G RAT, the SN uses 5G RAT, and the data volume is counted into the 5G RAT in the duplication transmission).

In step 1604, the SN performs the statistics for each DRB of a PDCP at an SN side. If data volume of a PDCP PDU generated by the PDCP is V, data volume of a PDCP PDU issued by the PDCP to RLC of the SN side is Vs (may be equal to 0), and data volume of a PDCP PDU issued by the PDCP to RLC of an MN side is Vm (may be equal to 0), then RAN data volume V1 where a duplicated part is not counted satisfies that V1=V, RAN data volume Vd of a duplicated part satisfies that Vd=Vs+Vm−V, 5G data volume VrS where a duplicated part is not counted satisfies that VrS=Vs, and 4G data volume VrM where a duplicated part is not counted satisfies that VrM=Vm−Vd.

In step 1605, the CU-UP of the SN sends an RAN data volume report to the CU-CP of the SN. The RAN data volume report includes at least one of V1 of the each DRB of the PDCP at the SN side, VrS of the each DRB of the PDCP at the SN side or VrM of the each DRB of the PDCP at the SN side.

In step 1606, the CU-CP of the SN sends the RAN data volume report to the MN. The RAN data volume report includes the at least one of V1 of the each DRB of the PDCP at the SN side, VrS of the each DRB of the PDCP at the SN side or VrM of the each DRB of the PDCP at the SN side.

In step 1607, the MN performs the statistics for each DRB of a PDCP at the MN side. If data volume of a PDCP PDU generated by the PDCP is V, data volume of a PDCP PDU issued by the PDCP to RLC of the MN side is Vm (may be equal to 0), and data volume of a PDCP PDU issued by the PDCP to RLC of the SN side is Vs (may be equal to 0), then RAN data volume V1 where a duplicated part is not counted satisfies that V1=V, RAN data volume Vd of a duplicated part satisfies that Vd=Vm+Vs−V, 4G data volume VrM where a duplicated part is not counted satisfies that VrM=Vm−Vd, and 5G data volume VrS where a duplicated part is not counted satisfies that VrS=Vs.

In step 1608, the MN sends an RAN data volume report to the CN. The RAN data volume report includes at least one: a respective E-RAB identification corresponding to the each DRB, V1 of the each DRB, VrS of the each DRB, Vd of the each DRB, Vs of the each DRB or VrM of the each DRB (where the PDCP is located at the at least one of the MN side or the SN side).

Additionally, the data volume statistics may be performed for a PDCP SDU, in which the overheads of a PDCP header are subtracted in the data volume statistics.

It is to be noted that in another embodiment, OAM may send configuration information to the MN. In another embodiment, the CN or the OAM may not send configuration information to the MN.

In another embodiment, the granularity unit may be a UE, a PDU session, a QoS flow, a QoS flow group or the like.

Embodiment 17

Figure 17:
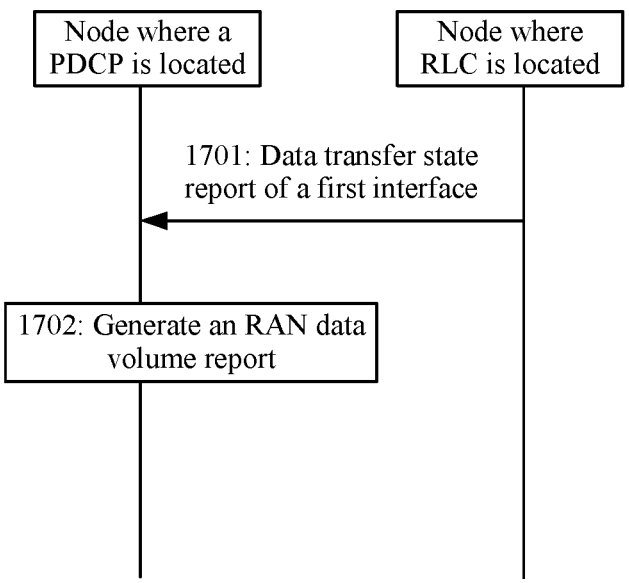
FIG. 17 is a flowchart of a radio access network data volume report method according to an embodiment of the present application.

As shown in FIG. 17, the method includes steps 1701 and 1702.

In step 1701, a node where RLC corresponding to a DRB is located sends a data transfer state report of a first interface to a node where a PDCP corresponding to the DRB is located. The data transfer state report of the first interface includes information about data packets lost at the first interface. The first interface is an X2 interface or an Xn interface in the case of dual connectivity. The first interface is an F1 interface in the case of CU DU split.

In step 1702, the node where the PDCP corresponding to the DRB is located counts the DRB. The data volume of the data packets lost at the first interface is subtracted in the statistics of data volume of a PDCP PDU generated by the PDCP, and the data volume of the data packets lost at the first interface is subtracted in the statistics of data volume of a PDCP PDU sent by the PDCP to RLC.

Additionally, the data volume statistics may be performed for a PDCP SDU, in which the overheads of a PDCP header are subtracted in the data volume statistics.

Embodiment 18

In step 1801, a node where a PDCP corresponding to a DRB is located counts the DRB. Data volume of data packets the PDCP has determined to discard is subtracted in the statistics of data volume of a PDCP PDU generated by the PDCP, and the data volume of the data packets the PDCP has determined to discard is subtracted in the statistics of data volume of a PDCP PDU sent by the PDCP to RLC.

Additionally, the data volume statistics may be performed for a PDCP SDU, in which the overheads of a PDCP header are subtracted in the data volume statistics.

It is to be noted that in the preceding embodiments, scenarios of dual connectivity and carrier aggregation are used as examples, but the present application is not limited thereto. The preceding data volume report methods may applied to the implementations in other scenarios. The duplicated part is 0 in the case where there is no duplication transmission.

Figure 18:
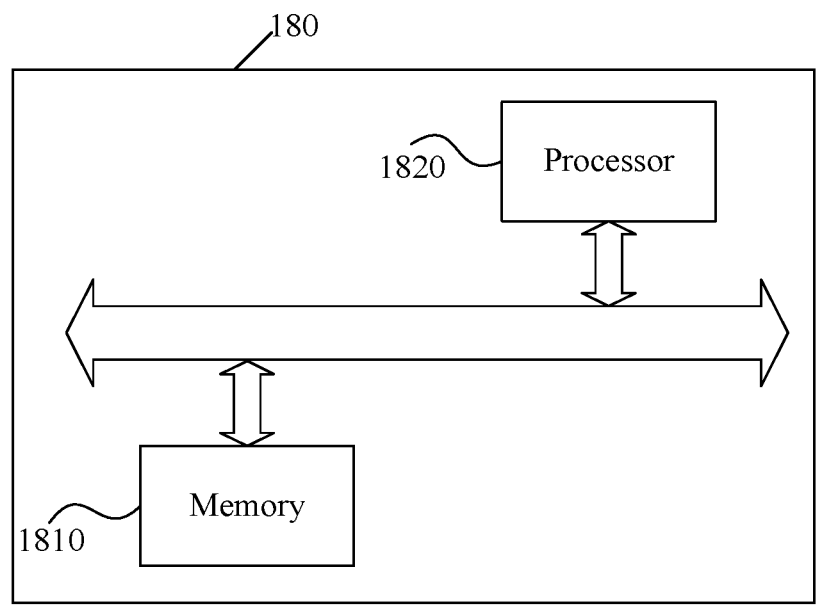
FIG. 18 is a block diagram of a radio access network data volume report apparatus according to an embodiment of the present application.

As shown in FIG. 18, an embodiment of the present application provides a radio access network data volume report apparatus 180. The apparatus 180 includes a memory 1810 and a processor 1820. The memory 1810 stores a program. The operations described below are performed when the program is read and executed by the processor 1820.

The following data volume information about a data radio bearer is acquired: data volume of a PDCP PDU or a PDCP SDU generated by a PDCP, and data volume of a PDCP PDU or a PDCP SDU issued by the PDCP to RLC.

A radio access network data volume report is generated according to the data volume information about the data radio bearer. The radio access network data volume report includes at least one of: RAN data volume of a granularity unit where a duplicated part is not counted, RAN data volume of the granularity unit where the duplicated part is counted, or RAN data volume of the duplicated part of the granularity unit.

The radio access network data volume report is sent to a core network.

In another embodiment, the radio access network data volume report method of any embodiment described above is performed when the program is read and executed by the processor 1820.

An embodiment of the present application provides a computer-readable storage medium. The computer-readable storage medium stores one or more programs. The one or more programs may be executed by one or more processors to perform the radio access network data volume report method of any embodiment described above.

The computer-readable storage medium includes a U disk, a read-only memory (ROM), a Random access memory (RAM), a mobile hard disk, a magnetic disk, an optical disk and multiple media capable of storing program codes.

An embodiment of the present application further provides a radio access network data volume report system. The system includes a node and a core network.

The node is configured to acquire data volume information about a data radio bearer, where the data volume information about the data radio bearer includes data volume of a PDCP PDU or a PDCP SDU generated by a PDCP, and data volume of a PDCP PDU or a PDCP SDU issued by the PDCP to radio link control; generate a radio access network data volume report according to the data volume information about the data radio bearer; and send the radio access network data volume report to the core network, where the radio access network data volume report includes at least one of: RAN data volume of a granularity unit where a duplicated part is not counted, RAN data volume of the granularity unit where the duplicated part is counted, or RAN data volume of the duplicated part of the granularity unit.

The core network is configured to receive the radio access network data volume report sent by the node.

In an embodiment, the core network is further configured to send configuration information to the node, where the configuration information includes at least one of: granularity unit information, or an indication whether the duplicated part is counted into the radio access network data volume report in duplication transmission; and the node is configured to generate the radio access network data volume report according to the data volume information about the data radio bearer in following manner: generating the radio access network data volume report according to the configuration information and the data volume information about the data radio bearer.

In an embodiment, the node includes a master node and a secondary node.

The secondary node is configured to acquire information about each PDCP at a secondary node side, where the information about each PDCP at the secondary node side includes: data volume of a PDCP PDU or a PDCP SDU generated by the each PDCP, data volume of a PDCP PDU or a PDCP SDU issued by the each PDCP to radio link control of a master node side, and data volume of a PDCP PDU or a PDCP SDU issued by the each PDCP to radio link control of the secondary node side; generate a first radio access network data volume report and send the first radio access network data volume report to the master node, where the first radio access network data volume report includes identification information about a granularity unit, and at least one piece of following information at the secondary node side: radio access network data volume of the granularity unit where a duplicated part is not counted, data volume in radio access technology of the granularity unit at the master node side where the duplicated part is not counted, data volume in radio access technology of the granularity unit at the secondary node side where the duplicated part is not counted, radio access network data volume of the granularity unit where the duplicated part is counted, data volume in radio access technology of the granularity unit at the master node side where the duplicated part is counted, data volume in radio access technology of the granularity unit at the secondary node side where the duplicated part is counted, or radio access network data volume of the duplicated part of the granularity unit.

The master node is configured to acquire information about each PDCP at the master node side, where the information about each PDCP at the master node side includes data volume of a PDCP PDU or a PDCP SDU generated by the each PDCP, data volume of a PDCP PDU or a PDCP SDU issued by the each PDCP to radio link control of the master node side, and data volume of a PDCP PDU or a PDCP SDU issued by the each PDCP to radio link control of the secondary node side; generate a second radio access network data volume report and send the second radio access network data volume report to the core network, where the second radio access network data volume report includes identification information about a granularity unit, and at least one of:
radio access network data volume of the granularity unit where a duplicated part is not counted, data volume in radio access technology of the granularity unit at the master node side where the duplicated part is not counted, data volume in radio access technology of the granularity unit at the secondary node side where the duplicated part is not counted, radio access network data volume of the granularity unit where the duplicated part is counted, data volume in radio access technology of the granularity unit at the master node side where the duplicated part is counted, data volume in radio access technology of the granularity unit at the secondary node side where the duplicated part is counted, or radio access network data volume of the duplicated part of the granularity unit.

For other functions of the node and the core network, refer to the preceding embodiments, which are not repeated here.

Compared with the related art, at least one embodiment of the present application provides a solution of radio access network data volume report in duplication transmission to satisfy the needs of operators.

What is claimed is:

1. A radio access network data volume report method, comprising:
  acquiring, by a node, data volume information about a data radio bearer, wherein the data volume information about the data radio bearer comprises data volume of a packet data convergence protocol protocol data unit (PDCP PDU) or a packet data convergence protocol service data unit (PDCP SDU) generated by a packet data convergence protocol (PDCP), and data volume of a PDCP PDU or a PDCP SDU issued by the PDCP to radio link control;
  generating, by the node, a radio access network data volume report according to the data volume information about the data radio bearer, wherein the radio access network data volume report comprises at least one of: radio access network data volume of a granularity unit where a duplicated part is not counted, radio access network data volume of the granularity unit where the duplicated part is counted, or radio access network data volume of the duplicated part of the granularity unit; and
  sending, by the node, the radio access network data volume report to a core network.

2. The method of claim 1, wherein the node comprises a master node and a secondary node;
  wherein acquiring, by the node, the data volume information about the data radio bearer comprises:
  acquiring, by the master node, information about each PDCP at a master node side, wherein the information about the each PDCP at the master node side comprises data volume of a PDCP PDU or a PDCP SDU generated by the each PDCP, data volume of a PDCP PDU or a PDCP SDU issued by the each PDCP to radio link control of the master node side, and data volume of a PDCP PDU or a PDCP SDU issued by the each PDCP to radio link control of a secondary node side; and
  acquiring, by the secondary node, information about each PDCP at the secondary node side,
  wherein the information about the each PDCP at the secondary node side comprises data volume of a PDCP PDU or a PDCP SDU generated by a PDCP, data volume of a PDCP PDU or a PDCP SDU issued by the each PDCP to the radio link control of the master node side, and data volume of a PDCP PDU or a PDCP SDU issued by the each PDCP to the radio link control of the secondary node side;

wherein generating, by the node, the radio access network data volume report according to the data volume information about the data radio bearer comprises:

generating, by the secondary node, a first radio access network data volume report and sending the first radio access network data volume report to the master node, wherein the first radio access network data volume report comprises identification information about the granularity unit, and at least one piece of following information at the secondary node side:

radio access network data volume of the granularity unit where the duplicated part is not counted, data volume in radio access technology of the granularity unit at the master node side where the duplicated part is not counted, data volume in radio access technology of the granularity unit at the secondary node side where the duplicated part is not counted, radio access network data volume of the granularity unit where the duplicated part is counted, data volume in radio access technology of the granularity unit at the master node side where the duplicated part is counted, data volume in radio access technology of the granularity unit at the secondary node side where the duplicated part is counted, or radio access network data volume of the duplicated part of the granularity unit; and generating, by the master node, a second radio access network data volume report, wherein the second radio access network data volume report comprises identification information about a granularity unit, and at least one of:

radio access network data volume of the granularity unit where the duplicated part is not counted, data volume in radio access technology of the granularity unit at the master node side where the duplicated part is not counted, data volume in radio access technology of the granularity unit at the secondary node side where the duplicated part is not counted, radio access network data volume of the granularity unit where the duplicated part is counted, data volume in radio access technology of the granularity unit at the master node side where the duplicated part is counted, data volume in radio access technology of the granularity unit at the secondary node side where the duplicated part is counted, or radio access network data volume of the duplicated part of the granularity unit; and wherein sending, by the node, the radio access network data volume report to the core network comprises:

sending, by the master node, the second radio access network data volume report to the core network.

3. The method of claim 2, wherein the secondary node comprises a central unit control plane of the secondary node, and a central unit user plane of the secondary node;

wherein acquiring, by the secondary node, the information about the each PDCP at the secondary node side comprises:

acquiring, by the central unit user plane of the secondary node, the information about the each PDCP at the secondary node side; and wherein generating, by the secondary node, the first radio access network data volume report and sending the first radio access network data volume report to the master node comprises:

generating, by the central unit user plane of the secondary node, the first radio access network data volume report and sending the first radio access network data volume report to the central unit control plane of the secondary node; and sending, by the central unit control plane of the secondary node, the first radio access network data volume report to the master node.

4. The method of claim 1, wherein the node comprises a central unit control plane of the node, and a central unit user plane of the node;

wherein acquiring, by the node, the data volume information about the data radio bearer comprises:

acquiring, by the central unit user plane of the node, information about each PDCP, wherein the information about the each PDCP comprises the data volume of the PDCP PDU or the PDCP SDU generated by the PDCP, and the data volume of the PDCP PDU or the PDCP SDU issued by the PDCP to the radio link control;

wherein generating, by the node, the radio access network data volume report according to the data volume information about the data radio bearer comprises:

generating, by the central unit user plane of the node, the radio access network data volume report and sending the radio access network data volume report to the central unit control plane of the node; and wherein sending, by the node, the radio access network data volume report to the core network comprises:

sending, by the central unit control plane of the node, the radio access network data volume report to the core network.

5. The method of claim 1, wherein the granularity unit comprises at least one of:

a user equipment, an evolved universal terrestrial radio access network radio access bearer, a protocol data unit session, a quality of service flow, or a quality of service flow group.

6. The method of claim 1, further comprising:

receiving, by the node, configuration information sent by the core network or network management operating and maintaining, wherein the configuration information comprises at least one of granularity unit information, or an indication whether the duplicated part is counted into a radio access network data volume report in duplication transmission; and wherein generating, by the node, the radio access network data volume report according to the data volume information about the data radio bearer comprises:

generating, by the node, the radio access network data volume report according to the configuration information and the data volume information about the data radio bearer.

7. The method of claim 1, wherein the node comprises a master node and a secondary node, the method further comprising:

receiving, by the master node, first configuration information sent by the core network or network management operating and maintaining, wherein the first configuration information comprises at least one of an indication whether the duplicated part is counted into a radio access network data volume report in duplication transmission, information about radio access technology into which data volume is counted in duplication transmission, or granularity unit information; and sending, by the mater node, second configuration information to the secondary node, wherein the second configuration information comprises at least one of an indication whether the duplicated part is counted into a radio access network data volume report in duplication transmission, information about radio access technology into which data volume is counted in duplication transmission, or granularity unit information; and wherein generating, by the node, the radio access network data volume report according to the data volume information about the data radio bearer comprises:

generating, by the secondary node, a first radio access network data volume report according to the second configuration information and the data volume information about the data radio bearer; and generating, by the master node, a second radio access network data volume report according to the first configuration information and the data volume information about the data radio bearer.

8. The method of claim 1, wherein acquiring the data volume of the PDCP PDU or the PDCP SDU issued by the PDCP to the radio link control comprises:

in a case where the PDCP corresponding to the data radio bearer and the radio link control are located at different nodes, in response to acquiring the data volume of the PDCP PDU or the PDCP SDU issued by the PDCP to the radio link control, removing data volume of data packets lost at an interface between the node where the PDCP is located and a node where the radio link control is located.

9. The method of claim 1, wherein acquiring the data volume of the PDCP PDU or the PDCP SDU issued by the PDCP to the radio link control comprises:

in response to acquiring the data volume of the PDCP PDU or the PDCP SDU issued by the PDCP to the radio link control, removing data volume of data packets the PDCP has determined to discard.

10. A radio access network data volume report apparatus, which comprises a memory and a processor, wherein the memory stores a program which, when read and executed by the processor, perform the radio access network data volume report method of claim 1.

11. A non-transitory computer-readable storage medium, which stores at least one program, wherein the at least one program is executable by at least one processor to perform the radio access network data volume report method of claim 1.

12. A radio access network data volume report system, comprising a node and a core network, wherein the node is configured to acquire data volume information about a data radio bearer, wherein the data volume information about the data radio bearer comprises data volume of a packet data convergence protocol protocol data unit (PDCP PDU) or a packet data convergence protocol service data unit (PDCP SDU) generated by a packet data convergence protocol (PDCP), and data volume of a PDCP PDU or a PDCP SDU issued by the PDCP to radio link control; generate a radio access network data volume report according to the data volume information about the data radio bearer; and send the radio access network data volume report to the core network, wherein the radio access network data volume report comprises at least one of: radio access network data volume of a granularity unit where a duplicated part is not counted, radio access network data volume of the granularity unit where the duplicated part is counted, or radio access network data volume of the duplicated part of the granularity unit; and the core network is configured to receive the radio access network data volume report sent by the node.

13. The system of claim 12, wherein the core network is further configured to send configuration information to the node, wherein the configuration information comprises at least one of granularity unit information, or an indication whether the duplicated part is counted into the radio access network data volume report in duplication transmission; and the node is configured to generate the radio access network data volume report according to the data volume information about the data radio bearer in following manner: generating the radio access network data volume report according to the configuration information and the data volume information about the data radio bearer.

14. The system of claim 12, wherein the node comprises a master node and a secondary node, wherein the secondary node is configured to acquire information about each PDCP at a secondary node side, wherein the information about the each PDCP at the secondary node side comprises data volume of a PDCP PDU or a PDCP SDU generated by the each PDCP, data volume of a PDCP PDU or a PDCP SDU issued by the each PDCP to radio link control of the master node side, and data volume of a PDCP PDU or a PDCP SDU issued by the each PDCP to radio link control of a secondary node side; generate a first radio access network data volume report and send the first radio access network data volume report to the master node, wherein the first radio access network data volume report comprises identification information about the granularity unit, and at least one piece of following information at the secondary node side: radio access network data volume of the granularity unit where the duplicated part is not counted, data volume in radio access technology of the granularity unit at the master node side where the duplicated part is not counted, data volume in radio access technology of the granularity unit at the secondary node side where the duplicated part is not counted, radio access network data volume of the granularity unit where the duplicated part is counted, data volume in radio access technology of the granularity unit at the master node side where the duplicated part is counted, data volume in radio access technology of the granularity unit at the secondary node side where the duplicated part is counted, or radio access network data volume of the duplicated part of the granularity unit; and wherein the master node is configured to acquire information about the each PDCP at a master node side, wherein the information about the each PDCP at the master node side comprises data volume of a PDCP PDU or a PDCP SDU generated by the each PDCP, data volume of a PDCP PDU or a PDCP SDU issued by the each PDCP to radio link control of the master node side, and data volume of a PDCP PDU or a PDCP SDU issued by the each PDCP to radio link control of a secondary node side; generate a second radio access network data volume report and send the second radio access network data volume report to the core network, wherein the second radio access network data volume report comprises identification information about the granularity unit and at least one of:

radio access network data volume of the granularity unit where the duplicated part is not counted, data volume in radio access technology of the granularity unit at the master node side where the duplicated part is not counted, data volume in radio access technology of the granularity unit at the secondary node side where the duplicated part is not counted, radio access network data volume of the granularity unit where the duplicated part is counted, data volume in radio access technology of the granularity unit at the master node side where the duplicated part is counted, data volume in radio access technology of the granularity unit at the secondary node side where the duplicated part is counted, or radio access network data volume of the duplicated part of the granularity unit.

* * * * *